United States Patent [19]
Deering et al.

[11] Patent Number: 6,018,353
[45] Date of Patent: *Jan. 25, 2000

[54] THREE-DIMENSIONAL GRAPHICS ACCELERATOR WITH AN IMPROVED VERTEX BUFFER FOR MORE EFFICIENT VERTEX PROCESSING

[75] Inventors: Michael F. Deering, Los Altos; Michael Neilly, Menlo Park, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,280

[22] Filed: Jun. 30, 1997

Related U.S. Application Data

[63] Continuation-in-part of application No. 08/511,294, Aug. 4, 1995, Pat. No. 5,793,371, and application No. 08/511,326, Aug. 4, 1995, Pat. No. 5,842,004.

[51] Int. Cl.[7] .................................................. G06F 13/00
[52] U.S. Cl. ............................................ 345/511; 345/202
[58] Field of Search .................................... 345/508, 511, 345/513, 519, 501, 503, 509, 202

[56] References Cited

U.S. PATENT DOCUMENTS

| | | | |
|---|---|---|---|
| 5,740,409 | 4/1998 | Deering | 345/503 |
| 5,745,125 | 4/1998 | Deering et al. | 345/503 |
| 5,767,856 | 6/1998 | Peterson et al. | 345/503 |
| 5,793,371 | 8/1998 | Deering | 345/418 |
| 5,821,949 | 10/1998 | Deering | 345/505 |
| 5,842,004 | 11/1998 | Deering et al. | 345/501 |
| 5,867,167 | 2/1999 | Deering | 345/419 |
| 5,870,094 | 2/1999 | Deering | 345/419 |

OTHER PUBLICATIONS

OpenGL Architecture Review Board, "OpenGL Reference Manual," The Official Reference Document for OpenGL, Release 1, Nov. 1992, pp. 1–5.

"The OpenGL Machine," The OpenGL Graphics System Diagram, 1992 Silicon Graphics, Inc., 4 pages.

*Primary Examiner*—Kee M. Tung
*Attorney, Agent, or Firm*—Conley, Rose & Tayon; Dan R. Christen; Jeffrey C. Hood

[57] ABSTRACT

A vertex accumulation buffer for improved three-dimensional graphical processing is disclosed. The accumulation buffer may include two individual buffers (buffers A and B) that each comprise a plurality of individual storage locations that are each configured to store vertex parameter values such as XYZ values, normal values, color information, and alpha information. The individual buffers serve to double buffer the vertex parameter values stored in the accumulation buffer. The storage locations may be written to on an individual basis without overwriting the other storage locations in the buffer.

20 Claims, 25 Drawing Sheets

Command Block Diagram

Format Converter Opcodes FIG. 6

Vertex Accumulation Buffer

| fc_vab_iden | VAB register loaded (A buffer) |
|---|---|
| 0000 0000 0000 0000 | None |
| 0000 0000 0000 0001 | Header  *Header may be loaded at any time |
| 0000 0000 0000 001x | X |
| 0000 0000 0000 010x | Y |
| 0000 0000 0000 100x | Z |
| 0000 0000 0001 000x | R |
| 0000 0000 0010 000x | G |
| 0000 0000 0100 000x | B |
| 0000 0000 1000 000x | A |
| 0000 0001 0000 000x | NX |
| 0000 0010 0000 000x | NY |
| 0000 0100 0000 000x | NZ |
| 0000 1000 0000 000x | U |
| 0001 0000 0000 000x | V |
| 0010 0000 0000 000x | FNX |
| 0100 0000 0000 000x | FNY |
| 1000 0000 0000 000x | FNZ |
| 0000 0111 0000 000x | 48 bit Normal (Nx,Ny,Nz) |

Load enables to the Vertex Accumulation Buffer

FIG. 8

Vertex Buffer

Vertex Buffer

Vertex Buffer Control Logic

Vertex Buffer Organization

Selection Of Load State Machine buffers 0-2 will be used
buffers 3-5 may be used
buffers 6-8 are unused Vertex Buffer Storage Of FFB Polygons buffers 0-1 will be used
buffers 2-4 may be used
buffers 5-8 are unused Vertex Buffer Storage Of FFB Fast Fill Primitives Vertex Buffer Storage Of FFB Rectangles Vertex Buffer Organization For Vertical Scroll Vertex Buffer Load State Machine (vb_1dsm)

Vertex Buffer FFB Load State Machine

Vertex Pointer Logic

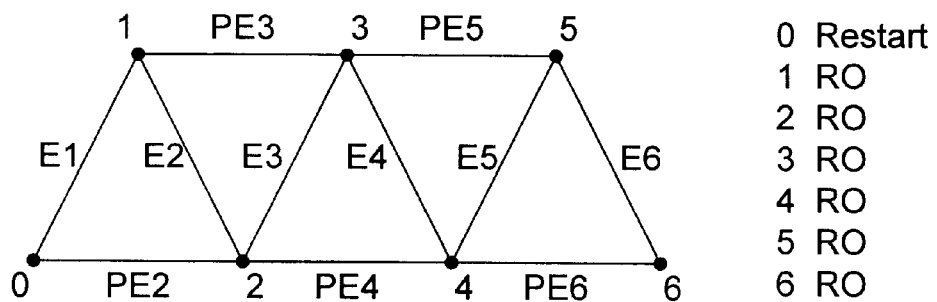
0 Restart
1 RO
2 RO
3 RO
4 RO
5 RO
6 RO
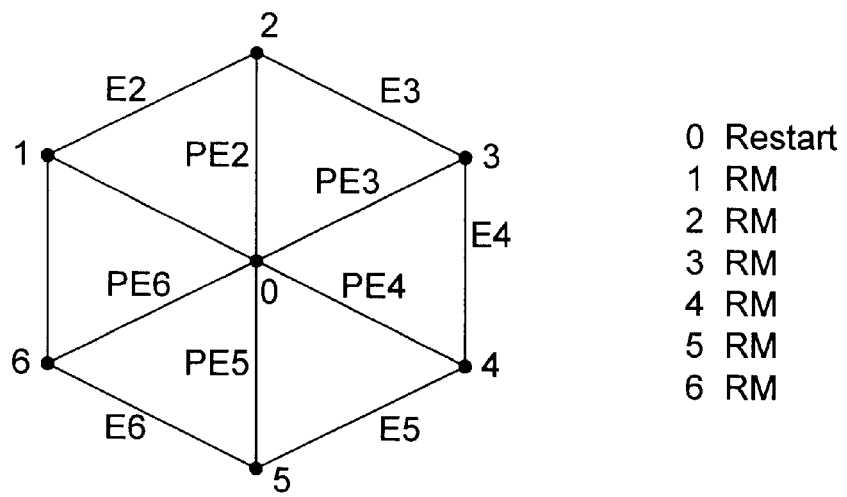
0 Restart
1 RM
2 RM
3 RM
4 RM
5 RM
6 RM
Edge Logic Explanation
FIG. 21

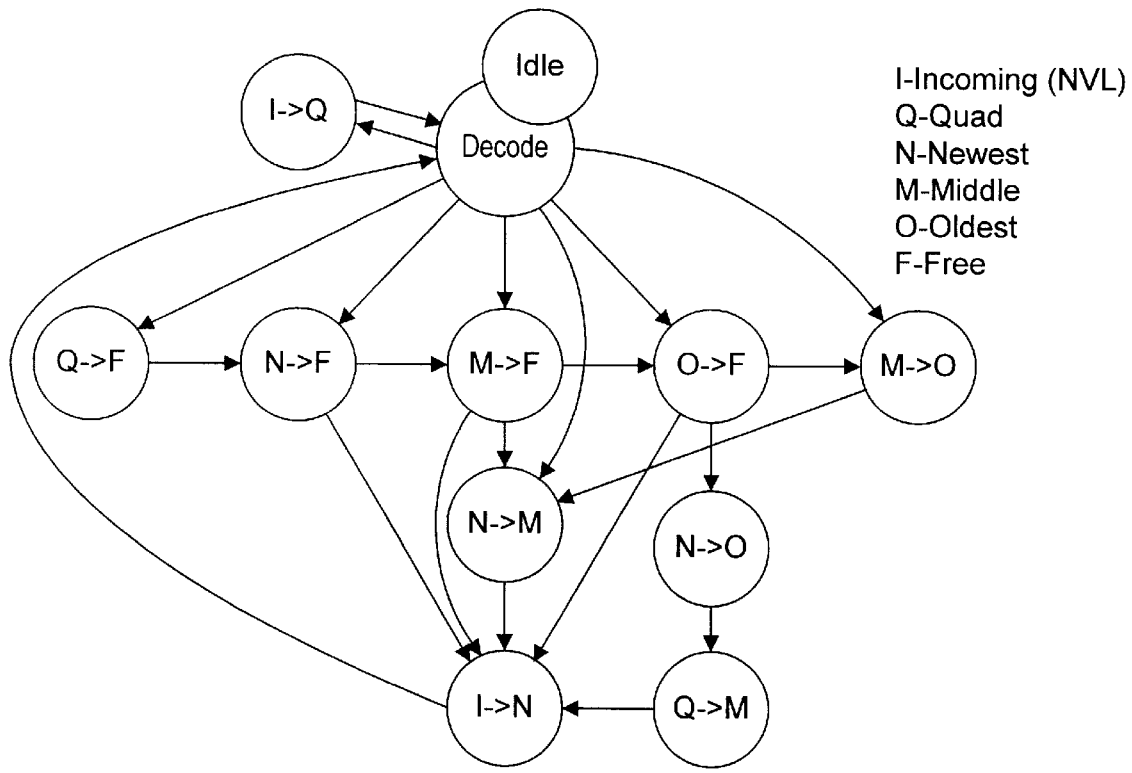

I-Incoming (NVL)
Q-Quad
N-Newest
M-Middle
O-Oldest
F-Free

Valid transitions

| Condition | Transitions |
|---|---|
| Quad | |
| Restart | Q->F, N->F, M->F, O->F, I->N |
| Restart+1 cycle | N->M, I->N |
| Restart+2 cycle | M->O, N->M, I->N |
| *Restart+3cycle | I->Q |
| Replace Oldest | M->F, O->F, N->O, Q->M, I->N |
| *Replace Oldest + 1 | I->Q |
| Triangle | |
| Restart | N->F, M->F, O->F, I->N |
| Restart + 1 | M->O, N->M, I->N |
| *Restart + 2 | M->O, N->N, I->N |
| *Replace Oldest | M->F, N->M, I->N |
| *Replace Middle | |
| Line | |
| | N->F, M->F, I->N |
| Restart | N->F, M->F, I->N |
| Move | N->M, I->N |
| *Draw | |
| Dot | |
| | N->F, I->N |
| *Restart | N->F, I->N |
| *Draw | |

*Indicates a complete primitive vb_vplsm
FIG. 22

Vertex Buffer FFB Output State Machine (vb_fosm)

FIG. 25a Substitution Replication Control Register

| 31 | 17 16 15 14 13 12 11 10 9 8 7 6 5 4 3 2 1 0 |
|---|---|
| Reserved | O | Replicate U N R Z Y X | Substitute U N R Z Y X |

FIG. 25b Primitive Control Register

| 31 | 13 12 11 10 9 8 7 6 5 4 3 2 1 0 |
|---|---|
| Reserved | Rev | Ord | FN | U/V | N | Type |

FIG. 25c XGL Header Register

| 31 | 15 14 | 8 7 6 5 4 3 2 1 0 |
|---|---|---|
| Reserved | Header Mask | O | E | F | T | O | E |

FIG. 25d Float Enable Mask Register

| 31 | 10 9 8 7 6 5 4 3 2 1 0 |
|---|---|
| Reserved | C | D | 1 | F5 | F4 | F3 | F2 | F1 | F0 |

| Address | Source | Contents | Signals used to load |
| --- | --- | --- | --- |
| 0x0060_1D60 | NVL | {0000, nvl[4], 0000, nvl[3]} | cb_nvl_ctxld |
| 0x0060_1D64 | NVL | {0000, nvl[2], 0000, nvl[1]} | cb_nvl_ctxld |
| 0x0060_1D68 | NVL | {0000, nvl[0], 0000, rptr, 0, wptr, fcount}} | cb_nvl_ctxld |
| 0x0060_1D6C | FVL | {0, rptr, 0, wptr, 0, fcount, fv1[4:0]} | cb_fvl_ctxld |
| 0x0060_1D70 | QNMO | {quad, new, middle, oldest} | cb_vpl_ctxld |
| 0x0060_1D74 | *reserved* | reserved for misc state bits | |
| 0x0060_1D78 | Free A | {000, freequada, 000, freenewa, 000, freemiddlea, 000, freeolda} | cb_vpl_ctxld |
| 0x0060_1D7C | Free B | {000, freequadb, 000, freenewb, 000, freemiddleb, 000, freeoldb} | cb_vpl_ctxld |

Vertex Buffer State Registers Address Map

FIG. 26

| Address | Description |
| --- | --- |
| 0x0060_1D80 | Vertex Buffer 0 |
| 0x0060_1DC0 | Vertex Buffer 1 |
| 0x0060_1E00 | Vertex Buffer 2 |
| 0x0060_1E40 | Vertex Buffer 3 |
| 0x0060_1E80 | Vertex Buffer 4 |
| 0x0060_1EC0 | Vertex Buffer 5 |
| 0x0060_1F00 | Vertex Buffer 6 |
| 0x0060_1F40 | Vertex Buffer 7 |
| 0x0060_1F80 | Vertex Buffer 8 |
| 0x0060_1FC0 | Vertex Accumulation Buffer |

Vertex Buffer Memory and VAB Context Address Map

FIG. 27

THREE-DIMENSIONAL GRAPHICS ACCELERATOR WITH AN IMPROVED VERTEX BUFFER FOR MORE EFFICIENT VERTEX PROCESSING

CONTINUATION DATA

This application is a continuation-in-part of application Ser. No. 08/511,294, filed Aug. 4, 1995 now U.S. Pat. No. 5,793,371, entitled METHOD AND APPARATUS FOR GEOMETRIC COMPRESSION OF THREE-DIMENSIONAL GRAPHICS DATA, and assigned to the assignee of this application.

This application is a continuation-in-part of application Ser. No. 08/511,326, filed Aug. 4, 1995 now U.S. Pat. No. 5,842,004, entitled METHOD AND APPARATUS FOR DECOMPRESSION OF COMPRESSED GEOMETRIC THREE-DIMENSIONAL GRAPHICS DATA, and assigned to the assignee of this application.

Incorporation by Reference

U.S. application Ser. No. 08/511,294, filed Aug. 4, 1995 now U.S. Pat. No. 5,793,371, entitled METHOD AND APPARATUS FOR GEOMETRIC COMPRESSION OF THREE-DIMENSIONAL GRAPHICS DATA, and assigned to the assignee of this application, is hereby incorporated by reference as though fully and completely set forth herein.

U.S. application Ser. No. 08/511,326, filed Aug. 4, 1995 now U.S. Pat. No. 5,842,004, entitled METHOD AND APPARATUS FOR DECOMPRESSION OF COMPRESSED GEOMETRIC THREE-DIMENSIONAL, GRAPHICS DATA, and assigned to the assignee of this application, is hereby incorporated by reference as though fully and completely set forth herein.

FIELD OF THE INVENTION

The present invention relates to improved vertex pointer logic for assembling polygons from received geometry data in a three-dimensional graphics accelerator.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three-dimensional geometry data that defines three-dimensional graphics elements for display on a video output device. The application program causes the host processor to transfer the geometry data to the graphics accelerator. The graphics accelerator receives the geometry data and renders the corresponding graphics elements on the display device.

Applications which display three-dimensional graphics require a tremendous amount of processing capabilities. For example, for a computer system to generate smooth 3-D motion video, the computer system is required to maintain a frame rate or update rate of between 20 to 30 frames per second. This requires a 3-D graphics accelerator capable of processing over a million graphics primitives per second.

In general 3-D graphics accelerators have had three major bottlenecks which limit performance. A first bottleneck is the transfer of geometric primitive data from main memory to the graphics accelerator over the system bus. A second bottleneck is the vertex processing requirements (such as transformation, lighting, and set-up) which are performed on the geometric primitives by the graphics accelerator prior to rendering. A third bottleneck is the speed at which pixels from processed primitives can be filled into the frame buffer.

Vertex processing operations are typically performed by dedicated hardware in the graphics accelerator. This hardware is commonly pipelined, such that each stage of the pipeline effectuates a distinct operation on the vertices of the received geometric primitive. The operations may be performed in either fixed or floating-point math.

SUMMARY OF THE INVENTION

The present invention comprises improved vertex processing in a graphics accelerator.

A vertex accumulation buffer for improved three-dimensional graphical processing is disclosed. In one embodiment, the accumulation buffer may include two individual buffers (buffers A and B) that each comprise a plurality of individual storage locations. The individual storage locations are each configured to store vertex parameter values such as XYZ values, normal values, color information, and alpha information. The individual buffers serve to double buffer the vertex parameter values stored in the accumulation buffer. The storage locations may be written to on an individual basis without overwriting the other storage locations in the buffer.

In another embodiment, the vertex accumulation buffer may comprise a first buffer for storing a plurality of vertex values. The plurality of vertex values may include XYZ position values, red, green, and blue values, alpha values and normal values. The vertex accumulation buffer may further comprises a second buffer configured to receive and store copies of the plurality of vertex values. The first buffer may include a plurality of outputs (corresponding to each of the stored vertex values). The outputs may be coupled to corresponding inputs on the second buffer. The first buffer may be adapted to receive and store new vertex values. The old vertex values may remain unchanged in the first buffer until a new value overwrites the stored value. A graphics system configured to utilize the vertex accumulation buffer is also contemplated.

BRIEF DESCRIPTION OF THE DRAWINGS

A better understanding of the present invention can be obtained when the following detailed description of the preferred embodiment is considered in conjunction with the following drawings, in which:

FIG. 8 illustrates the valid assertions of the load enable lines to the vertex accumulation buffer;

FIG. 21 illustrates the relationship of edge bits to triangles;

FIG. 22 illustrates the vertex pointer logic state machine;

FIGS. 25a–d illustrates user defined registers;

FIG. 26 illustrates the vertex buffer state registers address map; and

FIG. 27 illustrates the vertex buffer memory and VAB context address map.

DETAILED DESCRIPTION OF THE EMBODIMENTS

Figure 1:
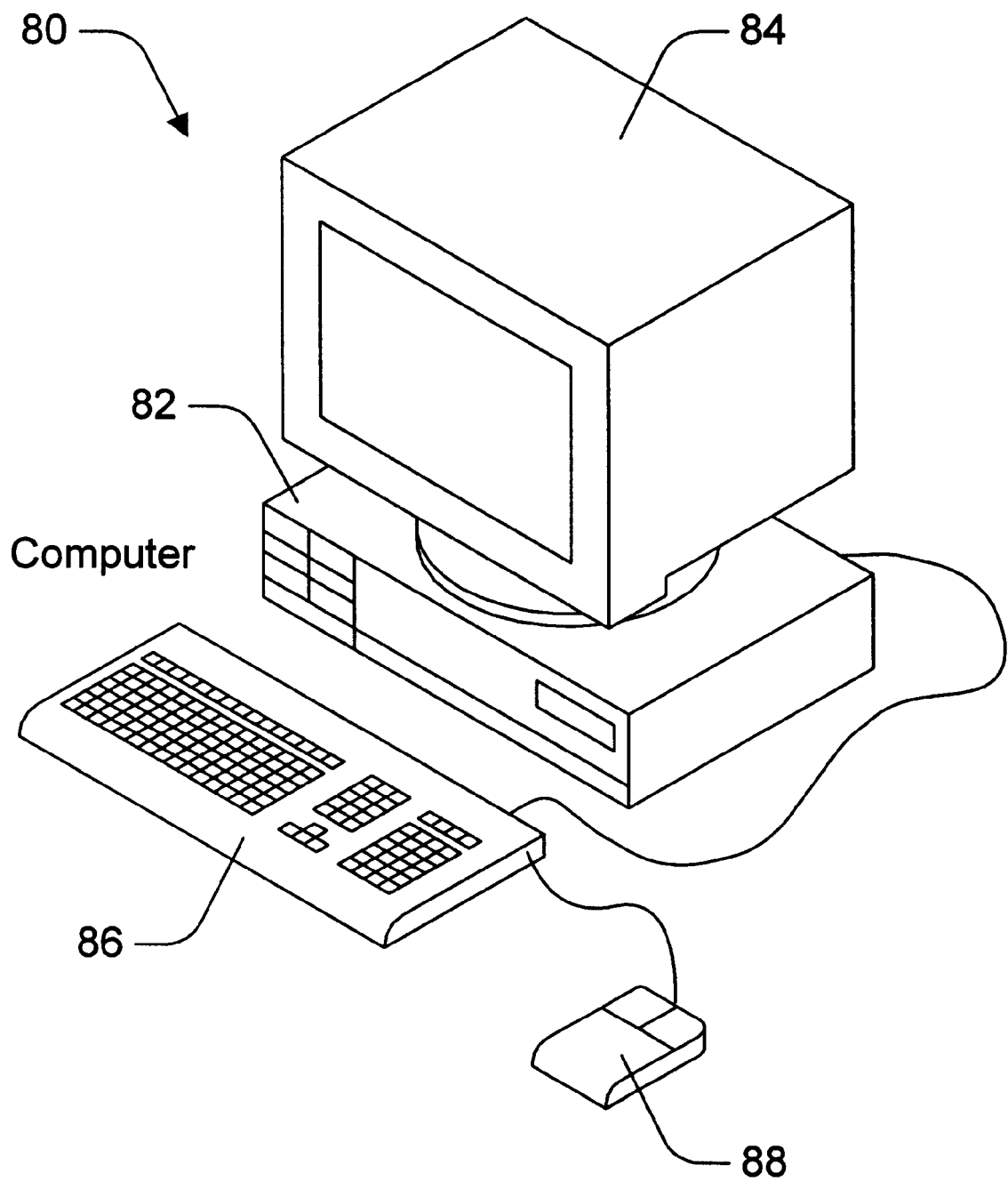
FIG. 1 illustrates a computer system which includes a three dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes a lighting unit which exhibits increased performance for handling of incoming color values of polygons used to render three-dimensional graphical objects on display device 84.

Figure 2:
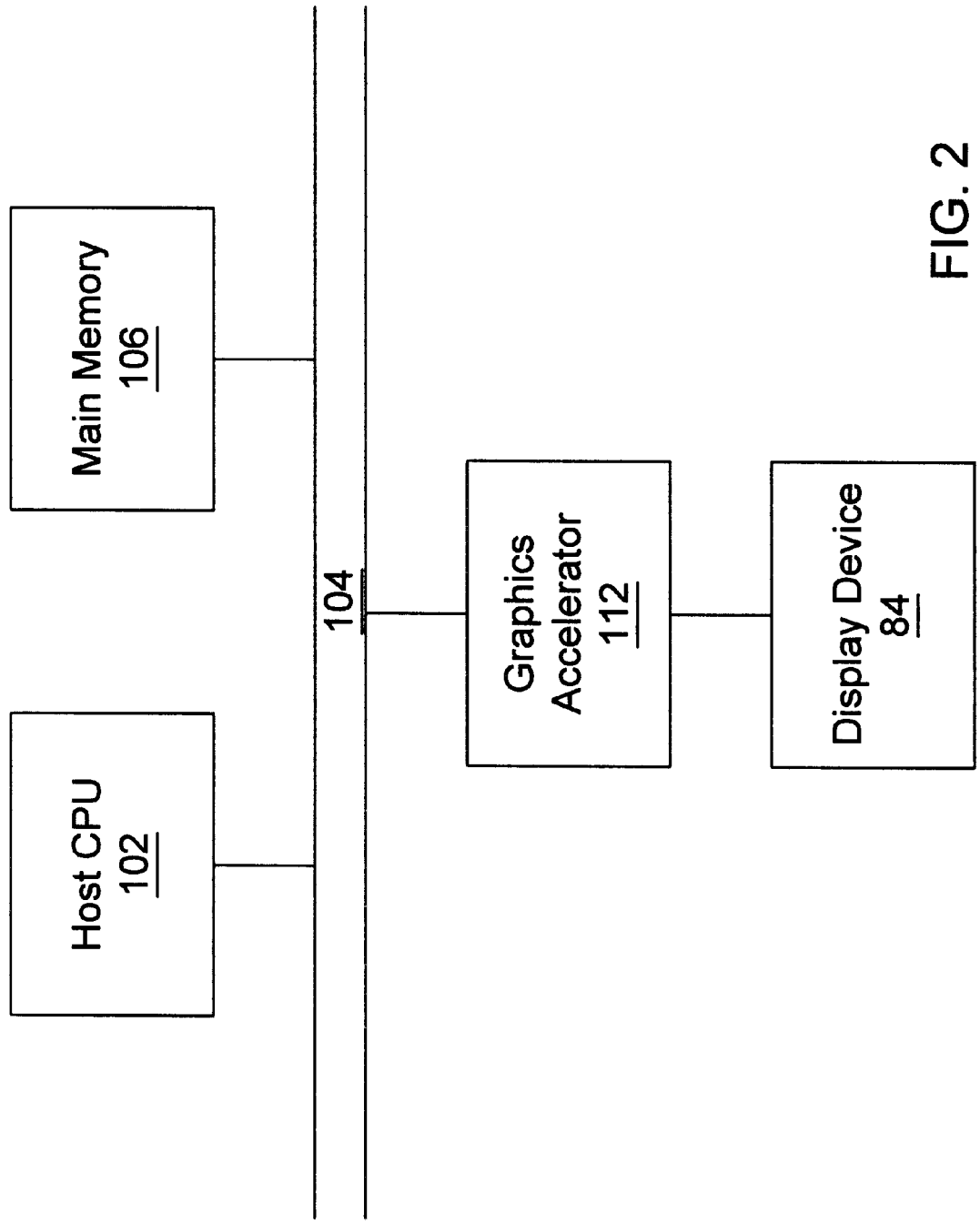
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112.

The host processor 102 may transfer information to and from the graphics accelerator 112 according to a programmed input/output (I/O) protocol over the host bus 104. Alternately, the graphics accelerator 112 accesses the memory subsystem 106 according to a direct memory access (DMA) protocol or through intelligent bus mastering.

A graphics application program conforming to an application programmer interface (API) such as OpenGL generates commands and data that define a geometric primitive such as a polygon for output on display device 84. As defined by the particular graphics interface used, these primitives may have separate color properties for the front and back surfaces. Host processor 102 transfers these commands and data to memory subsystem 106. Thereafter, the host processor 102 operates to transfer the data to the graphics accelerator 112 over the host bus 104. Alternatively, the graphics accelerator 112 reads in geometry data arrays using DMA access cycles over the host bus 104. In another embodiment, the graphics accelerator 112 is coupled to the system memory 106 through a direct port, such as the Advanced Graphics Port (AGP) promulgated by Intel Corporation. As will be described below, graphics accelerator 112 is advantageously configured to more efficiently produce polygons to be rendered from received geometry data.

Figure 3:
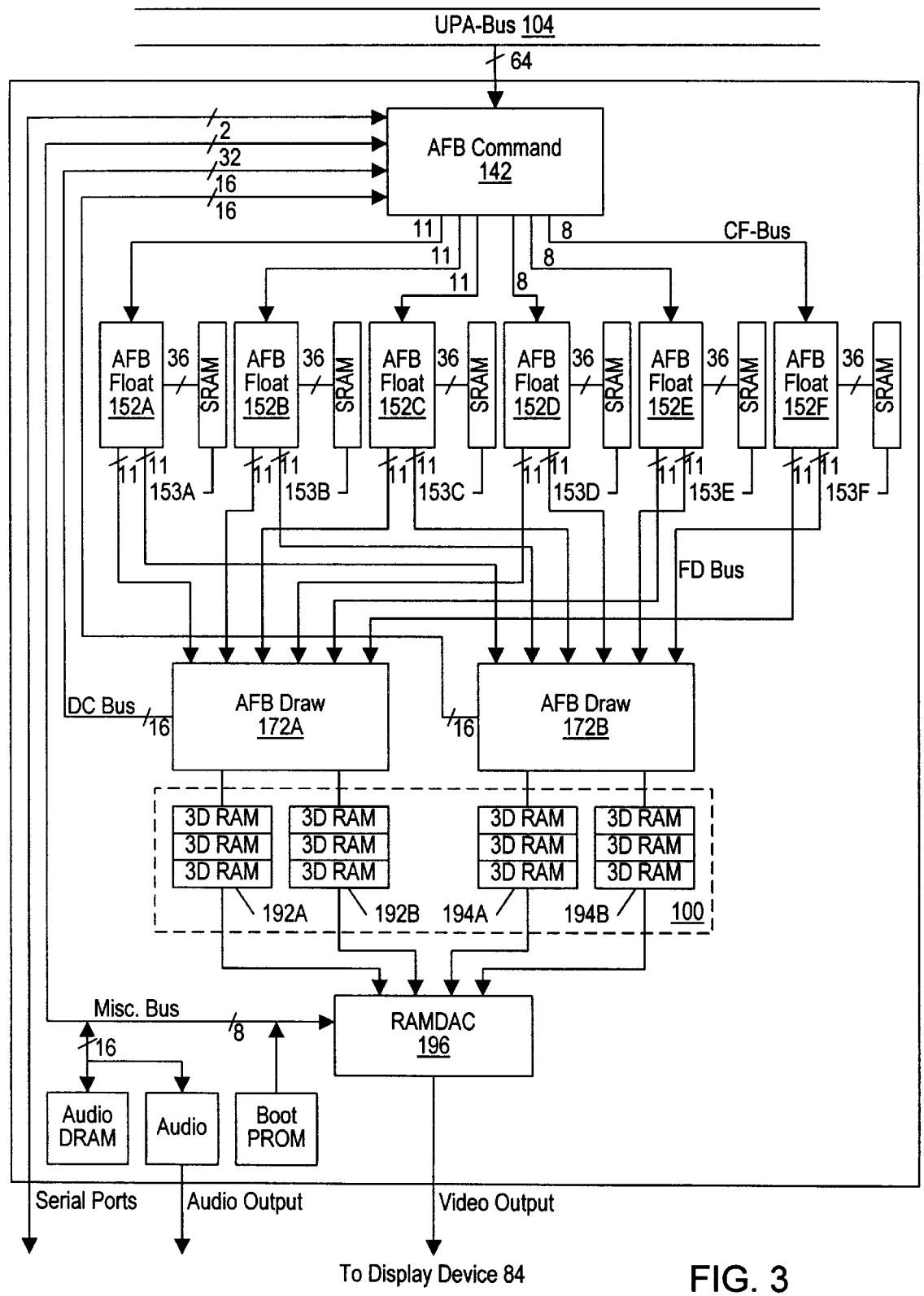
FIG. 3 is a block diagram illustrating the 3-D graphics accelerator according to the preferred embodiment of the present invention.

FIG. 3—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32 k×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. These commands and data (including polygons with both front and back surface properties) are passed in turn to floating point processors 152 for transformation, lighting, and setup calculations. The output data is then provided to the draw chips for rendering into the frame buffer. As described further below, the command block includes improved vertex pointer logic according to the present invention, which more efficiently creates complete polygons from received geometry data.

Figure 4:
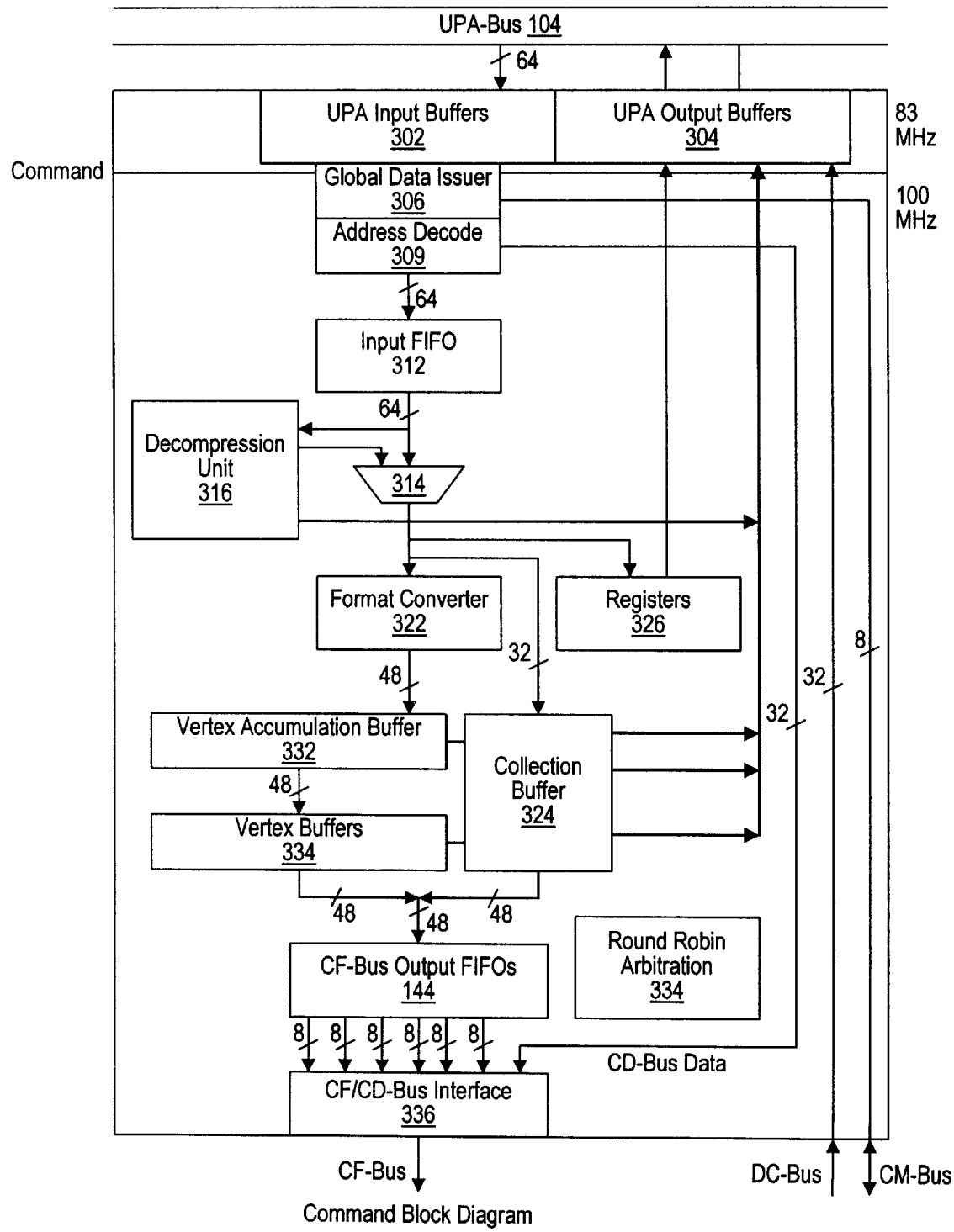
FIG. 4 is a block diagram illustrating the command chip in the 3-D graphics accelerator according to the preferred embodiment of the present invention.

FIG. 4—Command Block

As discussed above, the command preprocessor or command block 142 is coupled for communication over the host bus 104. The command preprocessor 142 receives geometry data arrays transferred from the memory subsystem 106 over the host bus 28 by the host processor 102. In the preferred embodiment, the command preprocessor 142 receives data transferred from the memory subsystem 106, including both compressed and non-compressed geometry data. When the command preprocessor 142 receives compressed geometry data, the command preprocessor 142 operates to decompress the geometry data to produce decompressed geometry data.

The command preprocessor 142 preferably implements two data pipelines, these being a 3D geometry pipeline and a direct port pipeline. In the direct port pipeline, the command preprocessor 142 receives direct port data over the host bus 104, and transfers the direct port data over the command-to-draw (CD) bus to the draw processors 172A–172B. As mentioned above, the CD bus uses or "borrows" portions of other buses to form a direct data path from the command processor 142 to the draw processor 172A–172B. The direct port data is optionally processed by the command preprocessor 142 to perform X11 functions such as character writes, screen scrolls and block moves in concert with the draw processors 172A–172B. The direct port data may also include register writes to the draw processors 172A–172B, and individual pixel writes to the frame buffer 3DRAM 192 and 194.

In the 3D geometry pipeline, the command preprocessor 142 accesses a stream of input vertex packets from the geometry data arrays. When the command preprocessor 142 receives a stream of input vertex packets from the geometry data arrays, the command preprocessor 142 operates to reorder the information contained within the input vertex packets and optionally delete information in the input vertex packets. The command preprocessor 142 preferably converts the received data into a standard format. The command preprocessor 142 converts the information in each input vertex packet from differing number formats into the 32 bit IEEE floating-point number format. The command preprocessor 142 converts 8 bit fixed-point numbers, 16 bit fixed-point numbers, and 32 bit or 64 bit IEEE floating-point numbers. For normal and color values, the command preprocessor 142 may convert the data to a fixed point value.

The command preprocessor 142 operates to accumulate input vertex information until an entire primitive is received. The command preprocessor 142 then transfers output geometry packets or primitive data over the command-to-floating-point (CF) bus to one of the floating-point processors 152A–152F. The output geometry packets comprise the reformatted vertex packets with optional modifications and data substitutions.

Referring now to FIG. 4, a block diagram illustrating the command processor or command block 142 is shown. As shown, the command block 142 includes input buffers 302 and output buffers 304 for interfacing to the host bus 104. The input buffers 302 couple to a global data issuer 306 and address decode logic 308. The global data issuer 306 connects to the output buffers 304 and to the CM bus and performs data transfers. The address decode logic 308 receives an input from the DC bus as shown. The address decode logic 308 also couples to provide output to an input FIFO buffer 312.

In general, the frame buffer has a plurality of mappings, including an 8-bit mode for red, green and blue planes, a 32-bit mode for individual pixel access, and a 64-bit mode to access the pixel color together with the Z buffer values. The boot prom 197, audio chip 198 and RAMDAC 196 also have an address space within the frame buffer. The frame buffer also includes a register address space for command block and draw processor registers among others. The address decode logic 308 operates to create tags for the input FIFO 312, which specify which logic unit should receive data and how the data is to be converted. The input FIFO buffer 312 holds 128 64-bit words, plus a 12-bit tag specifying the destination of data and how the data should be processed.

The input FIFO 312 couples through a 64-bit bus to a multiplexer 314. Input FIFO 312 also provides an output to a geometry decompression unit 316. As discussed above, the command block 142 receives both compressed and non-compressed geometry data. The decompression unit 316 receives the compressed geometry data and operates to decompress this compressed geometry data to produce decompressed geometry data. The decompression unit 316 receives a stream of 32-bit words and produces decompressed geometry or primitive data. Then decompressed geometry data output from the decompression unit 316 is provided to an input of the multiplexer 314. The output of the multiplexer 314 is provided to a format converter 322, a collection buffer 324 and register logic 326. In general, the decompressed geometry data output from the decompression unit is provided to either the format converter 322 or the collection buffer 324.

In essence, the geometry decompression unit 316 can be considered a detour on the data path between the input FIFO 312 and the next stage of processing, which is either the format converter 322 or the collection buffer 324. For data received by the command processor 142 which is not compressed geometry data, i.e., non-compressed data, this data is provided from the input FIFO 312 directly through the multiplexer 314 to either the format converter 322, the collection buffer 324, or the register logic 326. When the command processor 142 receives compressed geometry data, this data must first be provided from the input FIFO 312 to the geometry decompression unit 316 to be decompressed before being provided to other logic.

Thus, the command block 142 includes a first data path coupled to the input buffers 302 or input FIFO 312 for transferring the non-compressed geometry data directly through the multiplexer 314 to either the format converter 322 or the collection buffer 324. The command block 142 also includes a second data path coupled to the input buffers 302 or input FIFO 312 for receiving compressed geometry data. The second data path includes a geometry decompression unit coupled to an output of the input FIFO 312 for receiving and decompressing the compressed geometry input data to produce decompressed geometry input data.

The format converter 322 receives integer and/or floating point data and outputs either floating point or fixed point data. The format converter 322 provides the command processor 142 the flexibility to receive a plurality of different data types while providing each of the floating block units 152A–152F with only a single data type for a particular word.

The format converter 322 provides a 48-bit output to a vertex accumulation buffer 332. The vertex accumulation 332 in turn provides an output to vertex buffers 334. The vertex accumulation buffer 332 and the vertex buffers 334 provide outputs to the collection buffer 324, which in turn provides an output back to the output buffers 304.

The vertex accumulation buffer 332 is used to store or accumulate vertex data required for a primitive that is received from the format converter 322. The vertex accumulation buffer 332 actually comprises two sets of registers, i.e., is double buffered. The first set of registers is used for composing a vertex, and the second set of registers is used for copying the data into one of the vertex buffers 334. As discussed further below, these two sets of registers allow for more efficient operation. Data words are written one at a time into the first or top buffer of the vertex accumulation buffer 332, and these values remain unchanged until a new value overwrites the respective word. Data is transferred from the first set of registers to the second set of registers in one cycle when a launch condition occurs.

The vertex buffers 334 are used for constructing or "building up" geometric primitives, such as lines, triangles, etc. Lines and triangles require two and three vertices, respectively, to complete a primitive. According to one embodiment of the invention, new primitives may be created by replacing a vertex of an existing primitive when the primitive being created shares one or more vertices with the prior created primitive. In other words, the vertex buffers 334 remember or maintain previous vertex values and intelligently reuse these vertex values when a primitive or triangle shares one or more vertices or other information with a neighboring primitive or triangle. This reduces the processing requirements and makes operation of the Open GL format operate more efficiently. In the preferred embodiment, the vertex buffers 334 can hold up to seven vertices. This guarantees maximum throughput for the worse case primitive, i.e., independent triangles. The vertex buffers 334 also operate at optimum speed for dots, lines and triangles and is substantially optimal for quad primitives.

Each of the vertex accumulation buffer 332 and the vertex buffers 334 are coupled to a collection buffer 324. The collection buffer 324 provides respective outputs to the output buffers 304 as shown. The vertex buffers 334 are coupled to provide outputs to CF bus output FIFOs 144. The collection buffer 324 is also coupled to provide outputs to the CF bus output FIFOs 144. The collection buffer 324 is used for sending all non-geometric data to the floating point blocks 152A–152F. The collection buffer 324 can hold up to 32 32-bit words. It is noted that the operation of copying data into the CF-bus output FIFOs 144 may be overlapped with the operation of copying new data into the collection buffer 324 for optimal throughput.

As mentioned above, the command block 142 includes a plurality of registers 326 coupled to the output of the multiplexer 314. The registers 326 also provide an output to the UPA output buffers 304. Register block 326 comprises 16 control and status registers which control the format and flow of data being sent to respective floating point blocks 152A–152F.

Each of the vertex buffers 334 and the collection buffer 324 provides a 48-bit output to CF-bus output FIFOs 144. The CF-bus output FIFOs 144 enable the command block 142 to quickly copy a primitive from the vertex buffers 334 into the output FIFO 144 while the last of the previous primitive is still being transferred across the CF-bus. This enables the graphics accelerator 112 to maintain a steady flow of data across each of the point-to-point buses. In the preferred embodiment, the CF-bus output FIFOs 144 have sufficient room to hold one complete primitive, as well as additional storage to smooth out the data flow. The CF output FIFOs 144 provide respective 8-bit outputs to a bus interface block 336. The bus interface 336 is the final stage of the command processor 142 and couples to the CF-bus as shown. In addition, the CF/CD bus interface 336 provides "direct port" accesses to the CDC bus which are multiplex on the CF-bus as mentioned above.

The command block 142 also includes round robin arbitration logic 334. This round robin arbitration logic 334 comprises circuitry to determine which of the respective floating point processors 152A–152F is to receive the next primitive. As discussed above, the graphics accelerator 112 of the present invention comprises separate point-to-point buses both into and out of the respective floating point processors 152A–152F. Thus, the round robin arbitration logic 334 is included to distribute primitives evenly between the chips and thus maintain an even flow of data across all of the point-to-point buses simultaneously. In the preferred embodiment, the round robin arbitration logic 334 utilizes a "next available round robin" arbitration scheme, which skips over a sub-bus that is backed up, i.e., full.

For information on another embodiment of the command processor 142, please see U.S. Pat. No. 5,408,605 titled "Command Preprocessor for a High Performance Three Dimensional Graphics Accelerator", which is hereby incorporated by reference in its entirety.

Vertex Buffer System

The Vertex Buffer organizes incoming vertices into primitives to be loaded into the CF bus output fifos for delivery to the AFB-Float ASICs. These manipulations include face orientation, substitution, replication, edge processing, and vertex ordering. These operations are handled by various pieces of the Vertex Buffer, which are discussed below.

Vertex Accumulation Buffer

Figure 5:
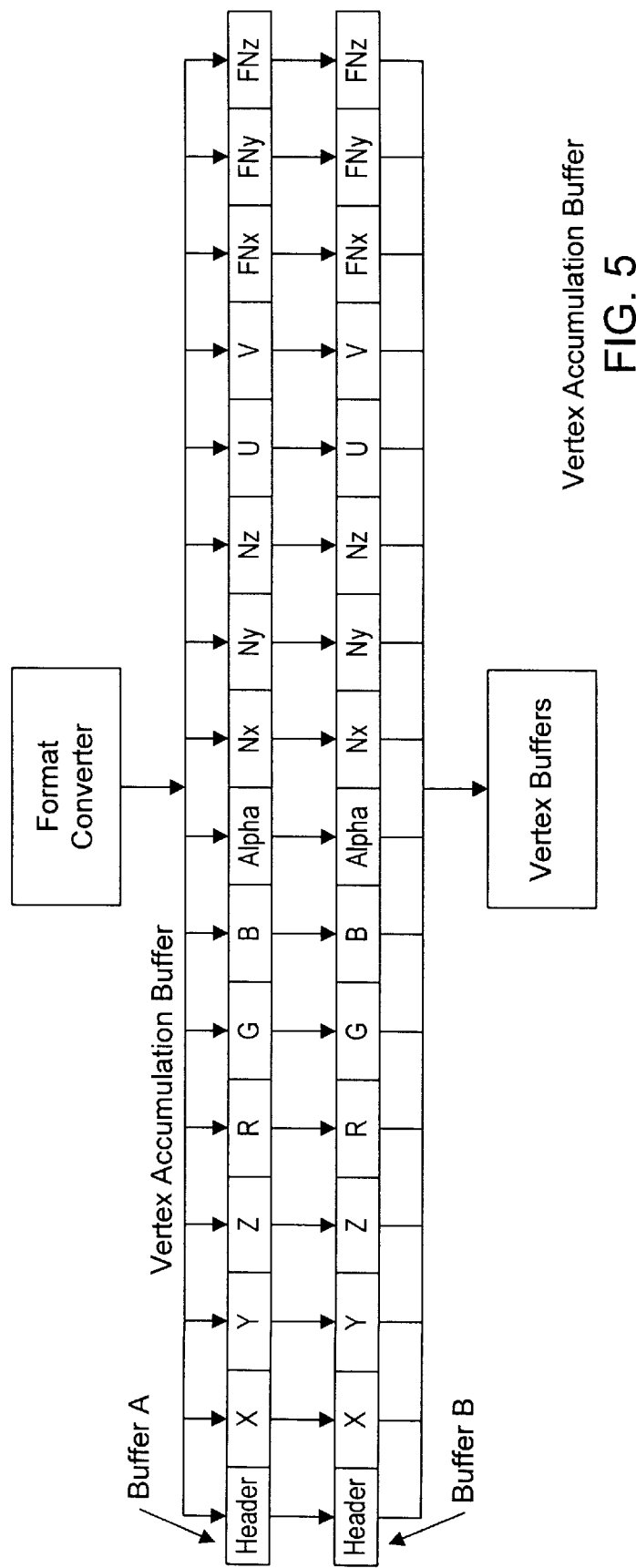
FIG. 5 illustrates the vertex accumulation buffer.

The Vertex Accumulation buffer facilitates OpenGL operation, and also simplifies other operation of the graphics accelerator. FIG. 5 shows the Vertex Accumulation buffer together with the other modules in the AFB-Command chip to which it is connected. Data comes into the VAB from the Format Converter and is written to one of the Vertex Buffers.

Incoming data is written to Buffer A of the Vertex Accumulation Buffer. There is a 7-bit word for the header, three 32-bit words for X, Y and Z, four 12-bit words for R, G. B and Alpha. three 16-bit words for $N_x$, $N_y$ and $N_z$, two more 32-bit words for U and V (texture coordinates_, and three 32-bit words for $FN_x$, $Fn_y$, and $FN_z$ (the facet normal). These words are written one at a time and remain unchanged until a new value overwrites the word. The feature of the words remaining the same "forever" allows a color, normal or Z value to be set in this buffer, with no need for other constant registers. It also permits the data to be written in any order.

When a "launch" condition occurs, the entire contents of Buffer A is written into Buffer A in one cycle. New values may then be written immediately to Buffer A while the contents of Buffer B is being copies into the appropriate Vertex Buffer. The transfer into the Vertex Buffer is accomplished 48 bits at a time (see FIG. 4–6 for the format of the 48-bit words). For OpenGL mode and some of the XGL modes, a write to an explicit address causes the launch condition. For bcopy mode in XGL the Format Converter Op-codes determine when to launch a vertex. For decompression mode the current mode and a counter determine when a launch condition has been reached.

A major advantage of this design over prior art designs is that there are no "dead cycles" during the data transfer on either side of the Vertex Accumulation Buffer.

Incoming Header Word

The incoming header word is defined to exactly match the XGL bit definition. The seven bits of this header word are defined as follows:

| | |
|---|---|
| Bit 0 | Draw edge |
| Bit 1 | Draw previous edge |
| Bits 2–3 | Triangle replace bits |
| Bit 4 | Face orientation (CCW) |
| Bit 5 | Edge is internal |
| Bit 6 | Previous edge is internal |

The individual bits have the following meanings:

Draw edge: For lines, this is the same as a move/draw bit. When zero the line starting position is specified and when one, a line is drawn from the previous point to the current point. For dots, the dot is not drawn when this bit is zero. When drawing triangle edges, this bit indicates that an edge is to be drawn from the newest vertex to the middle vertex.

Draw previous edge: This bit only applies while drawing triangle edges and indicates that an edge should be drawn from the newest vertex to the oldest vertex.

Triangle replace bits: A value of 00 in these two bits indicates to restart the triangle. The next two vertices received will complete the triangle, no matter what the value of the replace bits. That is to say, the replace bits are always ignored for the second and third vertices after a restart. A value of 01 indicates that the oldest of the three existing vertices is to be discarded in forming a new triangle. A value of 10 indicates that the middle of the three existing vertices is to be discarded in forming a new triangle.

Face Orientation: The face orientation bit is only used on a restart and is exclusive-Ored with the CCW bit of the Primitive Control Register to determine the current winding bit used when outputting primitives.

Note: The CCW bit in both the GT and ZX graphics accelerators was specified assuming a left-handed coordinate system (X positive up, Y positive to the right, Z positive going away from the viewer) as needed by PHIGS. This is actually backwards for XGL, which uses a right-handed coordinate system (Z is now positive coming towards the viewer). AFB will differ from its predecessors by specifying the CCW bit for a right-handed coordinate system.

Edge is internal: This bit is used when drawing hollow triangles and indicates that the edge from the most recent vertex to the middle vertex is an internal edge (part of a larger polygon) and is not to be drawn.

Previous edge is internal: Same as the above, but for the edge from the most recent vertex to the oldest vertex.

Format Converter Controller

When running in "immediate mode," both XGL and Open GL store data directly to the appropriate Vertex Accumulation Buffer registers based on the address to which the data is written. The addresses also specify to the Format Converter how the data is to be handled. However, when data is copied to AFB-Command in large blocks using bcopy, it can't be written to the required addresses that make immediate mode work. Some other way is required to specify how many words make up a vertex and how each word is to be treated.

Figure 6:
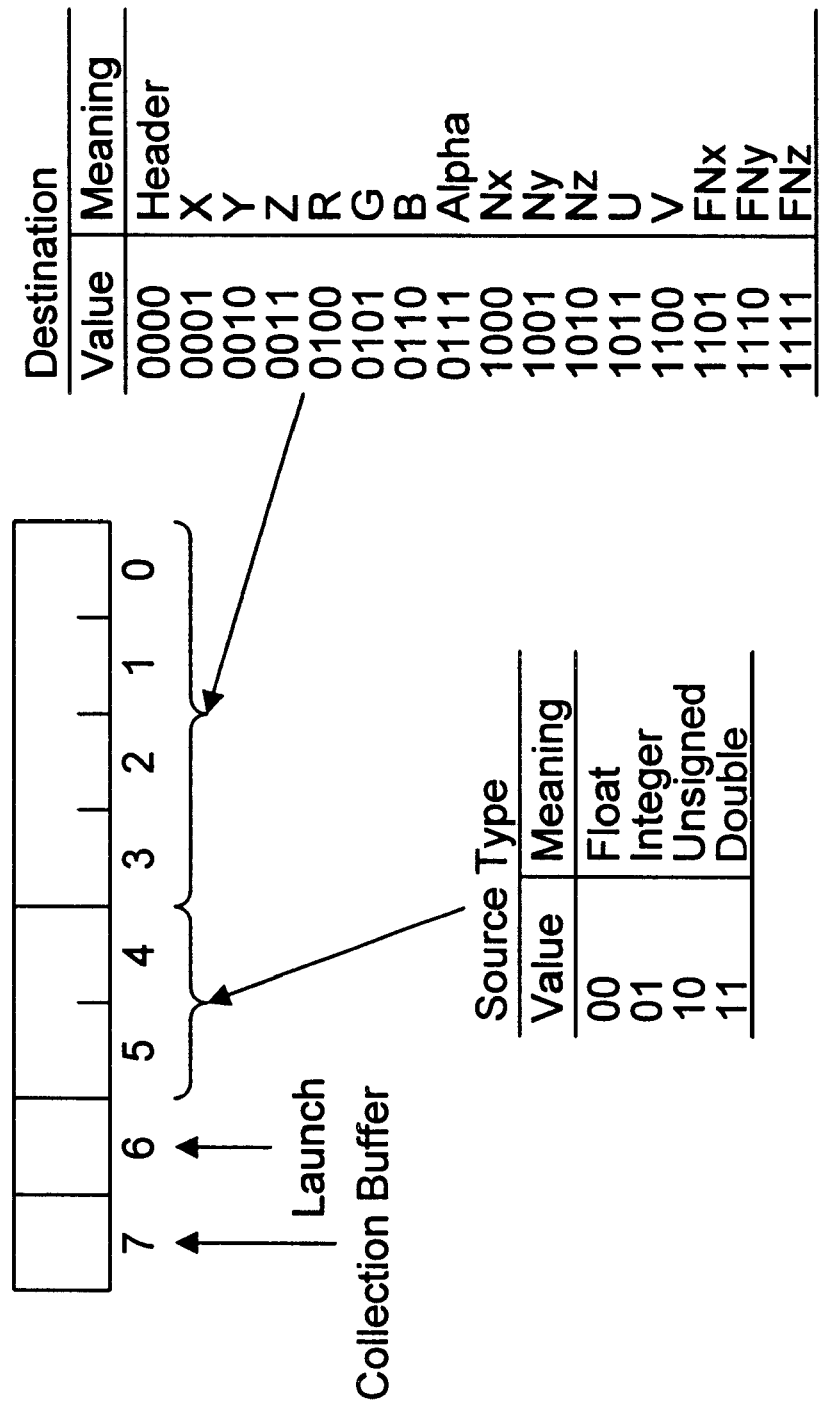
FIG. 6 illustrates format converter op-codes.

The Format Converter Controller at the bottom of the Input FIFO contains opcodes to specify how incoming data streams should be dealt with. The op-code format is shown in FIG. 6. The Destination field (bits 3-0) specify which of the 16 Vertex Accumulation Buffer registers is to receive each data word. The Source Type field (bits 5-4) specifies whether the incoming data is 32-bit IEEE floating-point, 32-bit signed integer fraction, 32-bit unsigned integer fraction or 64-bit double-precision IEEE floating-point. The last word of a vertex has the launch bit set (bit 6), all other words must keep this bit clear (or they suddenly become the last word of the vertex). The launch bit eliminates the need for a count register, as was needed in prior architectures.

Data is directed to the Collection Buffer instead of the Vertex Accumulation Buffer if bit 7 is set. No conversions are performed on the data in this case, so the launch bit is the only other bit that affects the data.

There is no provision for skipping vertex data as in prior art designs, but that can be easily accomplished by writing to a location twice or by writing to a location that is not used in the primitive as sent to the AFB-Float chips.

Figure 7:
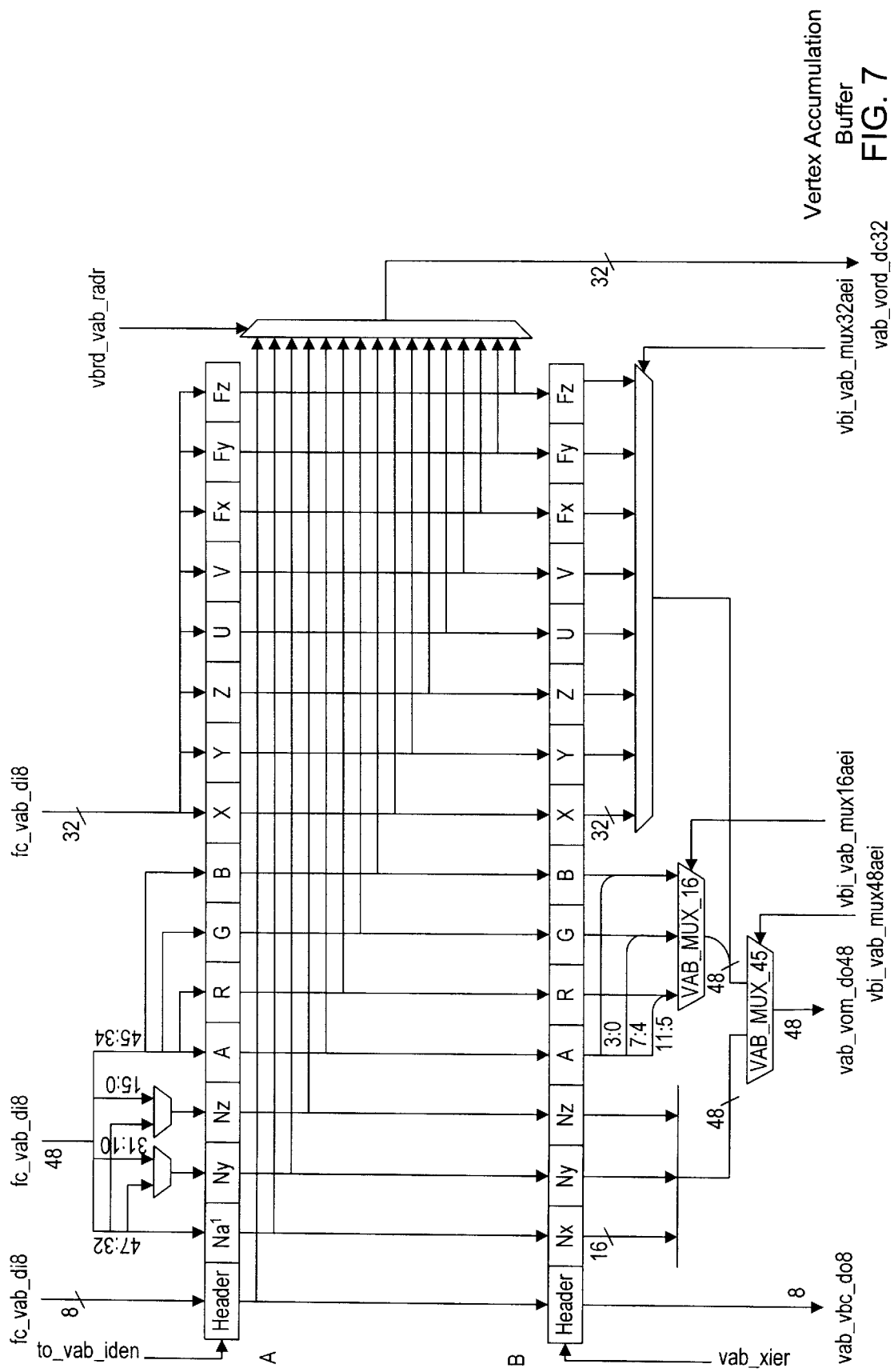
FIG. 7 is a more detailed diagram illustrating the vertex accumulation buffer.

The Vertex Accumulation Buffer is responsible for storing all converted data from the Format Converter. The VAB is organized as a double buffered set of registers: buffer A and buffer B as shown in FIGS. 5 and 7. The contents of buffer A are loaded by the Format Converter via a 16 bit load enable. The Format Converter indicates to the Vertex Buffer that it is done loading the VAB by asserting one of several "launch" signals. Also provided by the VAB is a 32 bit data path for reading the contents of the A buffer during register reads and context switches.

Each piece of data converted by the Format Converter gets placed into the Vertex Accumulation buffer. This is accomplished by the proper assertion of the 16 bit fc_vab_Iden lines. FIG. 8 shows the only valid assertions of the load enable (fc_vab_Iden) lines. Each line corresponds to a different register within the VAB. With the exception of two special cases the load enable lines are only asserted one at a time. A special case exists for normals. If the corresponding bits for all three normals are asserted then the two muxes seen above $N_y$ and $N_z$ in FIG. 7 will switch to the 48 bit path. This allows for loading of a single 48 bit normal from the Decompression Unit. When only one of the load enable bits corresponding to the normal registers is enabled then the upper 16 bits of the 48 bit path is used. Note also that the R, G, B and A registers use bits 45:34 of the 48 bit path. The other special case is that the Header register may be loaded in combination with any other register. This was done to accommodate certain querks in the architecture (namely performance in the FFB compatibility mode).

The mux logic following the VAB is used to pack the data from the VAB as it is transferred into the Vertex Buffer. Header information is not stored in the Vertex Buffers. It is stored directly in the Vertex Pointer Logic. The next section explains the format of the data as stored in the Vertex Buffer Memory.

Context is read from the A buffer of the VAB via the vbrd_vab_radr and vab_vbrd_d032 lines. The vbrd_vab_radr is a 4 bit address derived from the gdi_wads (GDI word address) which is used to select which of the VAB registers is to be read out onto the vab_vbrd_do32 bus.

Vertex Buffer

1. Vertex Buffer Organization

Figure 9:
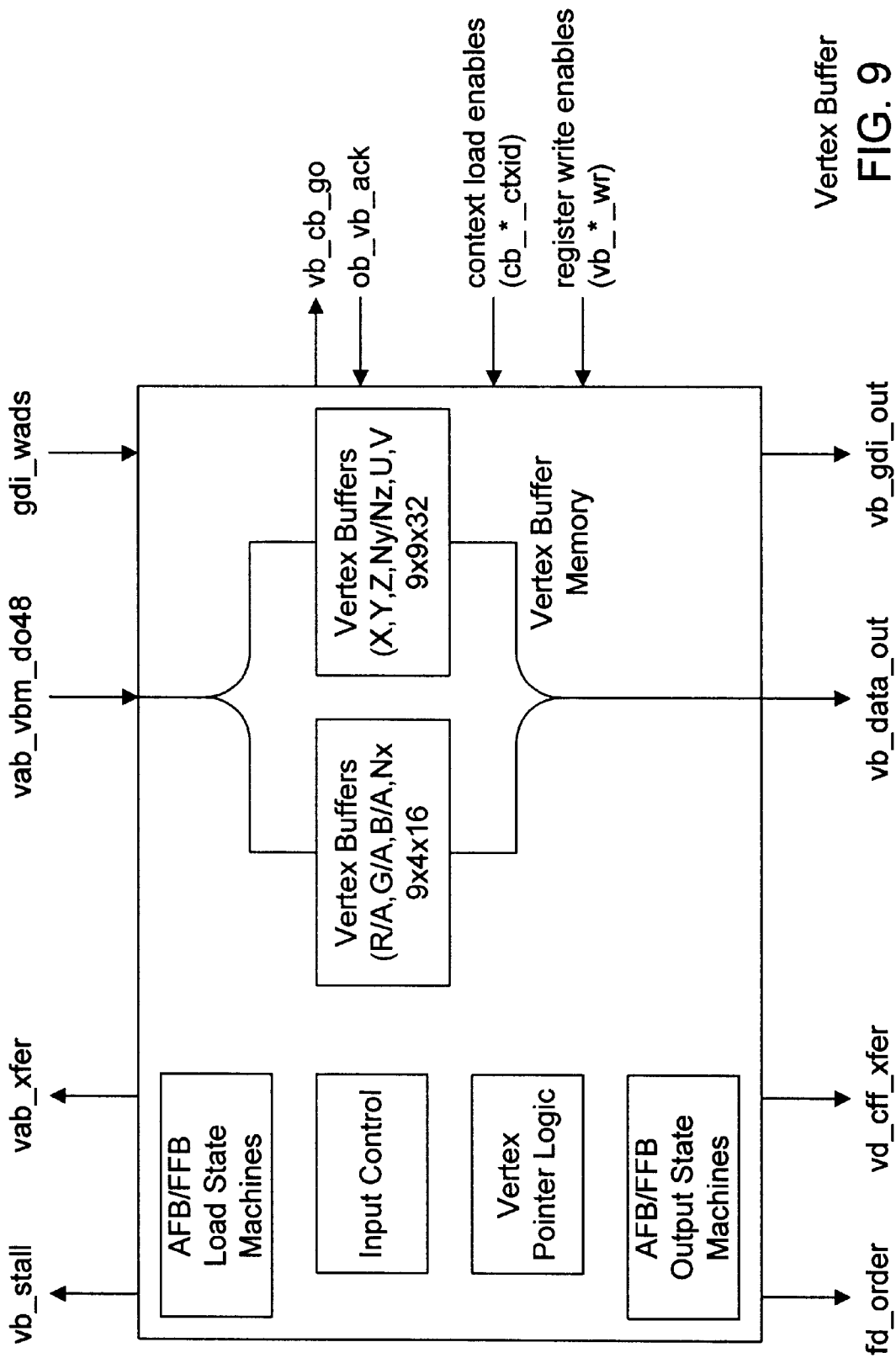
FIG. 9 is a block diagram of the vertex buffer.

The Vertex Buffer resides between the Vertex Accumulation buffer and CF bus output fifos. Data is loaded into the Vertex Buffer from the Vertex Accumulation buffer when a "launch" signal is received from the Format Converter. When enough vertices to assemble a complete primitive have been loaded into the Vertex Buffer Memory the primitive is loaded into the CF bus output fifos for delivery to the AFB-Float chips over the CF Bus. FIG. 9 diagrams the Vertex Buffer.

Figure 10:
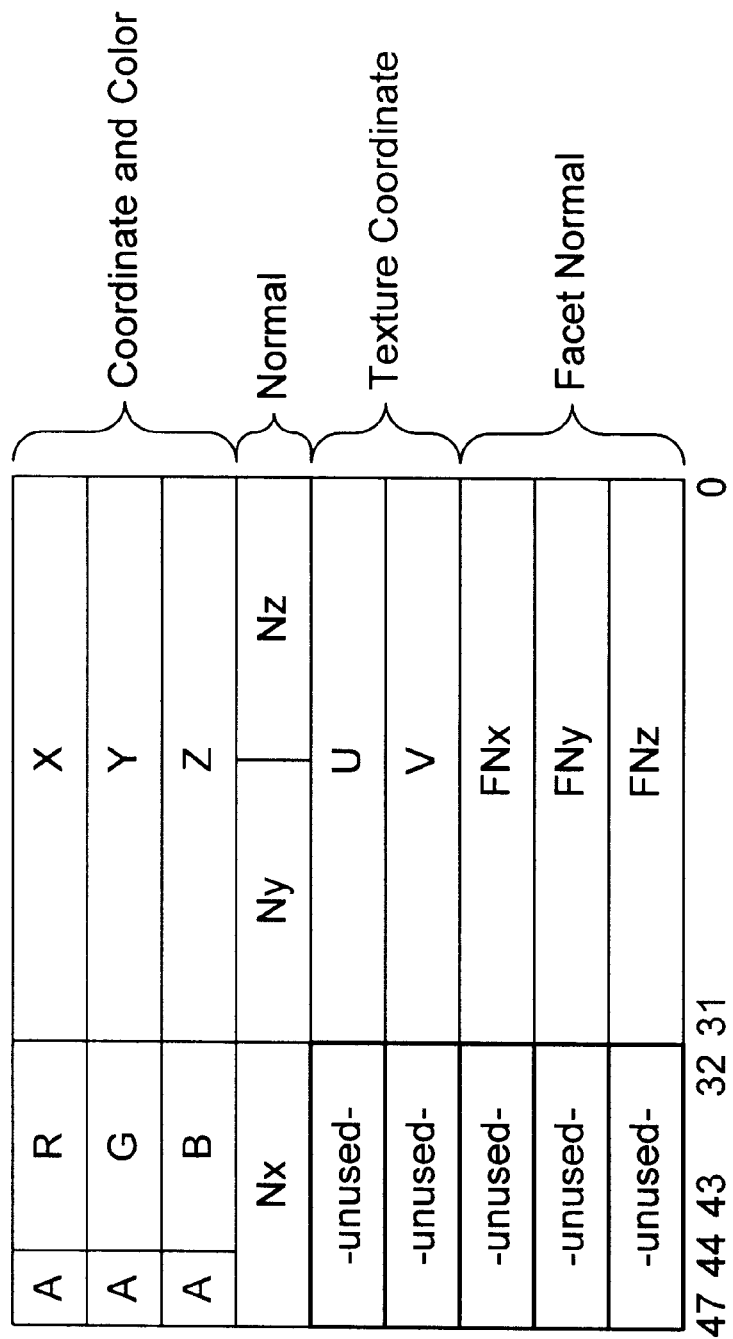
FIG. 10 illustrates organization of one of the vertex buffers.

The Vertex Buffers gather vertices to form complete geometric primitives: dots, lines, triangles, or quadrilaterals. There are seven vertex buffers; enough to run at maximum speed while gathering independent triangles; that is, three for the triangle currently being written out, three for the triangle being loaded in, and one extra for the overhead of moving the buffers around. Each word in the vertex buffer is 48 bits, to match the width of the data sent across CF-Bus to the AFB-Float chips. Data is transferred into each vertex buffer 48 bits at a time, even if this means reading from up to three separate values in the Vertex Accumulation Buffer. A diagram of one of the vertex buffers is shown in FIG. 10.

All vertices have an X Y Z coordinate and a color. There are three optional parts: the normal, the texture coordinate, and the facet normal. The facet normal actually applies to a full primitive, but the hardware is simpler with the facet normal attached to the vertex it came in with.

The seven vertex buffers are kept track of using three-bit pointers. These pointers are kept on one of six lists:

The Free list. These point to vertex buffers that are ready to receive data.

The New Guy vertex. A vertex transferred in from the Vertex Accumulation buffer gets put here first, along with the two-bit replacement code, until the previous primitive has been grouped is beginning to be transferred to the CF-Bus Output FIFOs. This vertex is then moved to one of the three working vertices.

The Newest vertex. This is the most recent vertex to be added to the working vertices.

The Middle vertex. This is the next to oldest working vertex.

The Oldest vertex. The vertex that has been a working vertex the longest.

The I Wanna Be Free list. When a vertex is taken from the New Guy vertex, either one vertex (the Oldest or Middle) will be recycled or all three in the case of a restart. These are placed on the "I Wanna Be Free" list until the primitive gets completely transferred, at which point they are moved to the free list.

Figure 11:
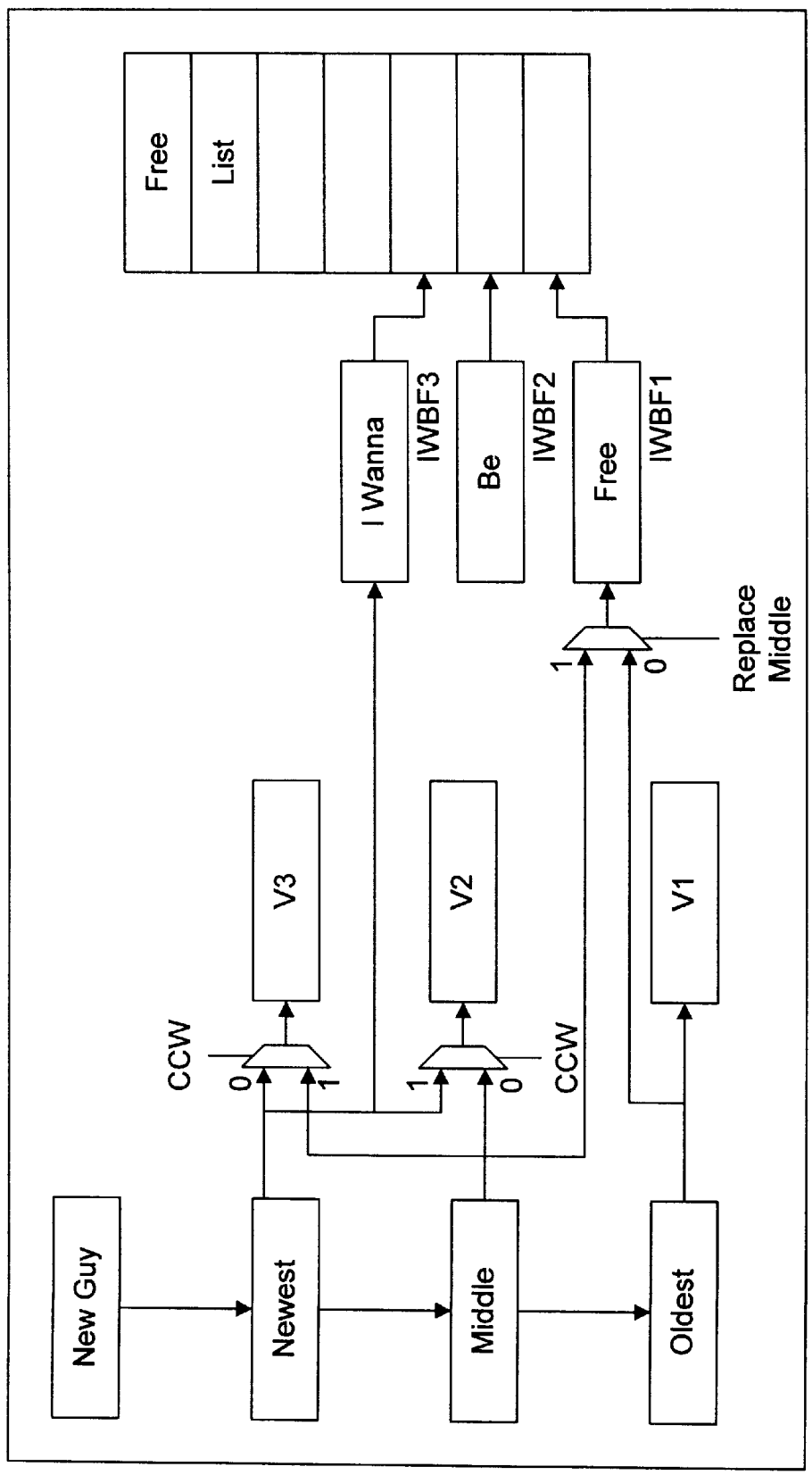
FIG. 11 illustrates the vertex buffer control logic.
Figure 12:
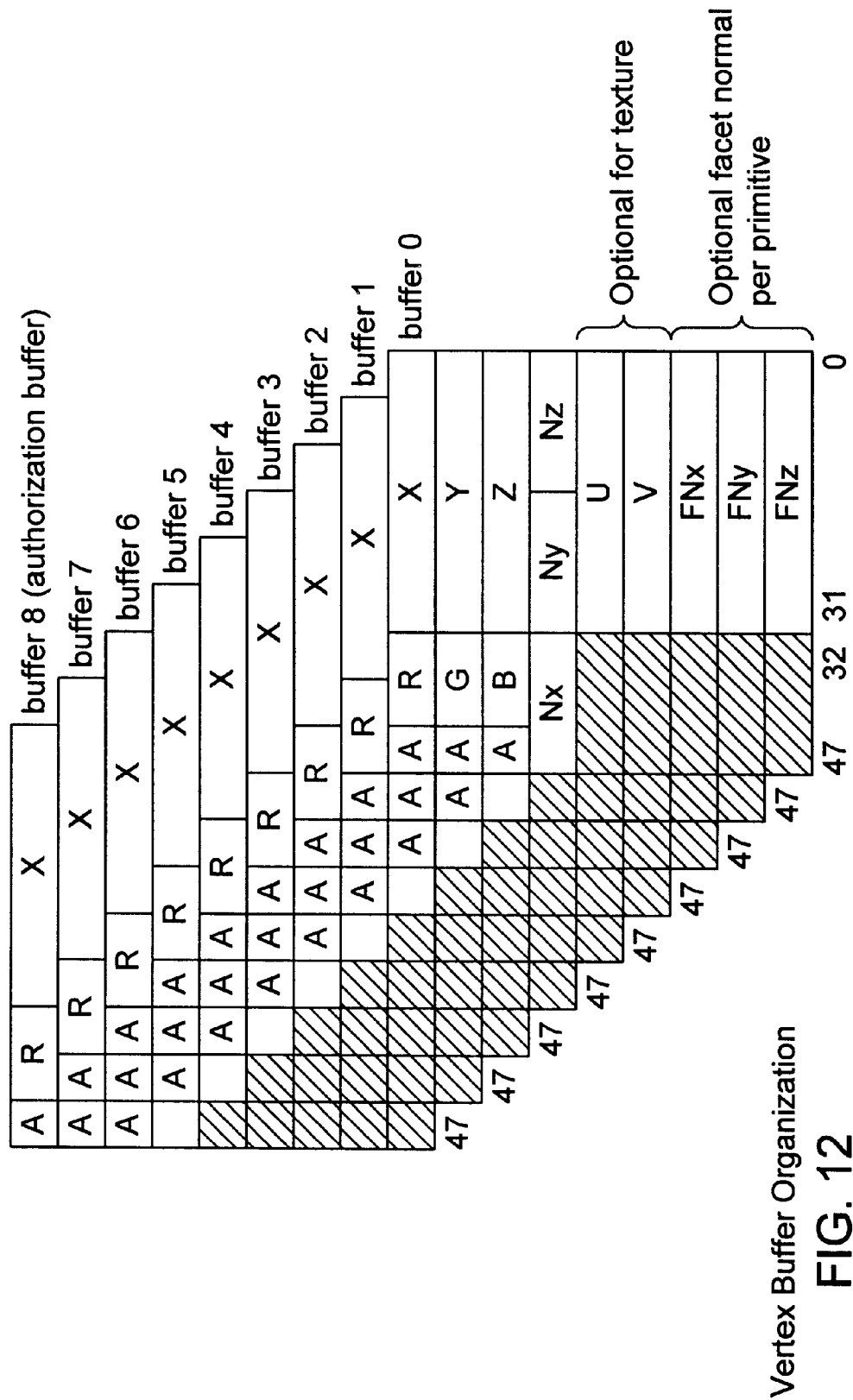
FIG. 12 is a more detailed diagram illustrating vertex buffer organization.

Once a complete primitive is held in the Newest, Middle, and Oldest registers, these three pointers are transferred to the Vertex Output Pointers so that the primitive may be sent out while the next one is being put together. This is shown in FIG. 11. It is noted that all registers shown in the diagram are three bits wide; this is not a large piece of logic like most other block diagrams.

State Machines

The Vertex Buffer control logic is made up of a number of small state machines. The following list is an attempt to describe all of them.

The working registers, Newest/Middle/Oldest, has a state machine with the following states:
  None—Only happens when logic is initialized.
  Have 1 vertex—After "none" or a restart.
  Have 2 vertices—After "have 1."
  Have 3 vertices—After "have 2" or after "have 3" and a replace condition.
  Have 3 vertices—transmitted—After the transfer to V1/V2/V3.

The V1/V2/V3 output registers get loaded all at once and are only temporaries to show the state of Newest/Middle/Oldest when the triangle was made complete. It has the following states:
  Outputting V1—After a triangle launch.
  Outputting V2—After "outputting V1."
  Outputting V3—After "outputting V2."
  Done outputting—After "outputtting V3."

The "I wanna be free" list keeps track of which vertices in the V1/V2/V3 registers need to be sent to the free list. These need to be held until the complete triangle is output.

Have none—Default state, when all have been returned.

Have 3—Only occurs on a restart.

Have 2—After "have 3."

Have 1—After "have 2" or any replace.

The free list behaves like a FIFO and has a counter that goes from zero to seven. When hardware gets initialized, it holds all seven. At most other times it holds less.

The "New Guy" vertex has two states:

Have none.

Have 1.

When the Registers Get Clocks

The working registers, Newest/Middle/Oldest, are clocked any time a "New Guy" is present and they are not waiting to output a completed primitive (i.e., not in the "have 3 vertices" state). They are all three clocked at once except on a replace middle condition. The oldest register is not clocked when replacing the middle vertex.

The V1/V2/V3 output registers all get clocked whenever a completed primitive is to be output (i.e., "done outputting" and the working registers are in the "have 3 vertices" state). Note that clockwise triangles are transferred Newest to V3, Middle to V2, and Oldest to V1. When a triangle is counterclockwise, Newest goes to V2 and Middle goes to V3. This is done so that triangles are always clockwise when sent to AFB-Float.

The "I wanna be free" registers get clocked at the same time that the "New Guy" gets transferred into the working registers. They all get clocked on a restart. Only IWBF1 gets clocked for replace middle or replace oldest. Note that the value clocked into IWBF1 is either from the Middle or Oldest register depending on whether the replacement code is replace middle or replace oldest, respectively.

The free list gets values clocked in from the "I wanna be free" list when the completed primitive has been transmitted and the V1/V2/V3 registers are in the "done transmitting" state. They are transmitted one at a time. Since the fastest a vertex could possible be created is three clocks, it is okay to take three clocks in the worst case to put register pointers back on the free list.

A value goes from the free list to the New Guy whenever there is at least one value on the free list and the New Guy is empty.

Please keep in mind that these registers are only used to index into the array of seven vertex buffers or for housekeeping purposes. The only ones that are actually used as indices are the "new guy" for writing data from the Vertex Accumulation buffer into a Vertex Buffer, and the V1/V2/V3 registers used when writing completed primitives to the CF-Bus Output FIFOs. All other registers are just there for housekeeping purposes.

Treatment of Lines and Dots

Lines behave similarly to triangles, but only the Middle (actually used as "Oldest" for lines) and Newest working registers get used and only two of the V1/V2/V3 registers are needed. The only replacement conditions are replace oldest or restart.

Dots just use one register, the Newest working register, and only one of the V1/V2/V3 registers. The only replacement condition is restart.

Quads

Dealing with quadrilaterals adds a little complexity to the design. Quads can be treated as triangles except when there is a facet normal or facet color. Then it is necessary to have four vertices present before anything can be output. This calls for a new Quads register added to the working registers after Oldest and a V4 register for output. Unlike triangles, quad strips require two new vertices to create a new primitive.

Quads are still output as triangles to the AFB-Float chips. First, V1, V2, and V3 are sent, then V3, V2 and V4.

Substitution and Replication

There are two cases where either the vertex color or the vertex normal is not the value actually output to the CF-Bus Output FIFO for a particular primitive. Substitution is where a different color or normal is output for all vertices. Replication is where the value in the last (or first) vertex is also used for the other vertices.

Substitution is done using an eighth vertex buffer called the substitution buffer. This is used for overriding the color during operations such as pick highlighting and to specify one facet normal for large polygons.

Replication is similar to substitution, except that the value comes from the Newest (or Oldest) vertex instead of the substitution register. This is needed when color interpolation is disabled, that is, when the color of the most recent vertex specifies the color of the entire triangle or line rather than having the color smoothly interpolated across the primitive. It is also used for faceted shading where one normal is used for all three vertices of a triangle.

The hardware performs substitution and replication by selecting the color fields from one vertex while selecting the XYZ values from another vertex while outputting a primitive to AFB-Float. If you look closely at FIG. 4–6 on page 4–27, you'll notice that 16 bits of color share a 48-bit field comes from the one vertex each time. For nornals, the whole 48-bit field comes from the one vertex each time. The implementation involves simple multiplexing of the address lines.

Collection Buffer

Attributes and other non-geometric data do not go through the Vertex Accumulation buffer or the Vertex Buffers, but are gathered into the Collection Buffer. Once a full primitive has been gathered, it is sent to the CF-Bus Output FIFOs. All collection buffer data is packed, one and one-half 32-bit words per 48-bit word, as it is written to the CF-Bus Output FIFOs.

There are two types of passthrough data: AFB-Float attributes which are broadcast to all six AFB-Float chips, and data or attributes sent to AFB-Draw which go through a single AFB-Float chip, just like geometric data. For broadcast data, no output is expected from any of the AFB-Float chips. Also, for broadcast primitives, all six Output FIFOs must have enough room in them before the data may be copied.

The Collection Buffer does not behave quite like a FIFO. The first data written to it is always started at location zero. The input pointer points at the next location to receive any data and also contains the count of how many words are in the buffer. When a launch condition occurs, the input pointer is copied to a count register and the input and output pointers are cleared to zero. Now, the data is copied out from the locations pointed to by the output pointer, with the point being incremented until it matches the count register. The last word sent is marked with the last word bit set.

Since copying data from the Collection Buffer to the CF-Bus Output FIFO is guaranteed to be uninterruptable and since new data coming in cannot be copied in faster than the data is read out, the next input operation can be overlapped with the data output. It is still unclear whether we will have to wait one cycle between the write that causes the launch and the write of the first word of the next data packet, or if the next write can happen on the same cycle as the read.

Counter Register

A separate 32-bit counter register is available for use with the Collection Buffer for certain special cases. The register may be set to count each 32-bit data word or, alternatively, to count each primitive. The counter may be sent either after the header word or it may be squeezed into the 9-bit field in the header word reserved for the texture address. There are two main intended uses of this counter: incrementing the texture address automatically, or incrementing a pixel address for faster writes. The control is made general to allow flexibility in the future when other uses are discovered.

The Vertex Buffer is implemented as two separately addressed buffers. The first is 9×4×16 and contains bits 47 through 32. The second is 9×9×32 and contains bits 31 through 0. This two buffer organization is required to support substitution of colors in which any of the components of a vertex may be replaced by the contents of the substitution buffer under control of the Substitution Replication control Register. The first eight buffers are used to store vertices used to build primitives. The ninth buffer is loaded by the host to contain information used for substitution. Any component may be substituted. FIG. 7 shows the format of data stored in Vertex buffer Memory for those primitives that rely on the Primitive Control Register (refer to FIG. 13).

When a complete vertex has been loaded into the VAB the Format Converter will generate a launch condition by asserting one of fc_vb_launch, fc_vb_ebxi or fc_vb_nxgo, fc_vb_launch indicates that there is a complete AFB vertex in the VAB.fc_vb_ebxi and fc_vb_nxgo are special case launch signals used to indicate FFB polygons and FFB fast fill primitives. For these primitives multiple launches (fc_vb_launch) occur before a complete primitive is assembled.fc_vb_ebxi and fc_vb_nxgo indicate the end of the primitives. A launch causes the data in buffer A of the VAB to be transferred into buffer B. The Format Converter is free to load new values into buffer A of the VAB until it is ready to launch. Once the Format Converter is ready to launch it CAN NOT LAUNCH if there is a vb_stall signal. If the Vertex Buffer Load State Machine or Vertex Buffer FFB Load State Machine (vb_ldsm) are not finished unloading buffer B the vb_stall signal will be asserted and a new launch is not permitted. This could happen if few components are updated in the VAB. After a transfer from the A to B buffers the data in the B buffer will be loaded into the Vertex buffer Memory before a context switch can occur. Therefore the only context in the VAB is the A buffer.

Not all components of the VAB are transferred into the Vertex Buffer. U, V, normals and Facet Normals are not transferred into the Vertex Buffer if the Primitive Control Register states that they are not being used. Although facet normals are only used on a per primitive basis, the hardware is simplified by storing them per vertex and allowing the output logic to determine whether they are sent out over the CF bus.

Figure 13:
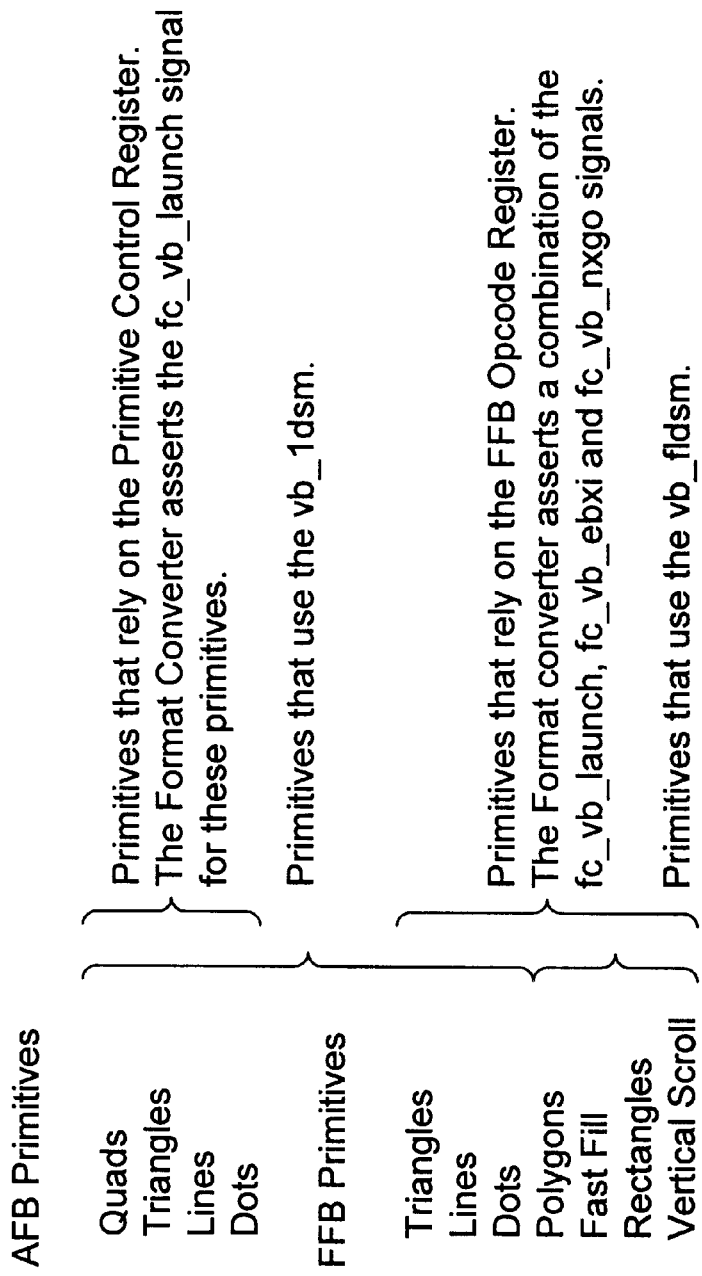
FIG. 13 lists the types of primitives supported by the vertex buffer as well as the primary control registers and state machines that handle the respective primitives.

FIG. 13 shows the types of primitive supported by the Vertex Buffer as well as the primary control registers and state machines that handle them.

There are two additional launch signals from the Format Converter which are used to synchronize Vertex and Collection Buffer transactions. These signals are fc_vb_cbreg and fc_vb_cblaunch which indicate that either a Vertex Buffer register or a CB packet is awaiting output from the Collection Buffer. These signals do not cause the vb_ldsm or vb_fldsm to transition out of the idle state; nor is any transfer made between buffers of the VAB. Instead a pointer of 0xF0 is loaded directly into the NVL of the Vertex Pointer Logic. This pointer when unloaded from the NVL generates the vb_cb_go signal to the Collection buffer indicating that it should output one packet and return the cb_vb_ack signal after doing so. Further description of these signals is given later in this chapter.

There are four special case FFB primitives (polygons, rectangles, vertical scroll and fast fill) that are organized differently when loaded into the Vertex Buffer. These primitives do not lend themselves well to the logic used to build quads, triangles, dots and lines; therefore, special load and output state machines are used to handle these primitives. The following diagrams show how data is stored in the Vertex Buffer for these primitives.

Figure 14:
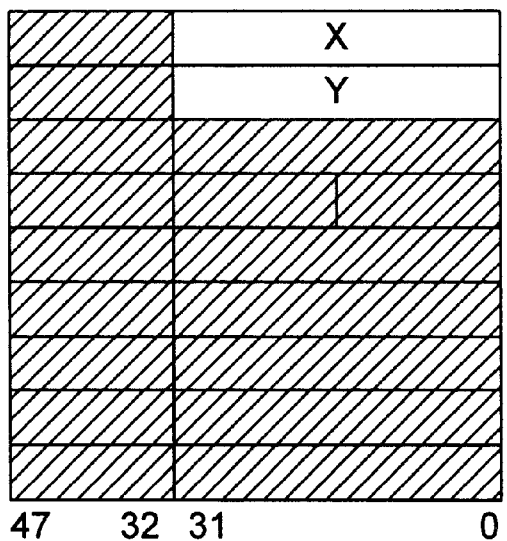
FIG. 14 illustrates vertex buffer storage of FFB polygons.

FFB polygons vary in size from 3–6 vertices. Since there are eight buffers available for primitives there are more than enough to handle polygons. The X and Y co-ordinate for vertex of the polygon are stored in a separate vertex buffer starting at buffer 0. No information other than X and Y are stored. FIG. 14 shows the format of polygon data stored in Vertex Buffer Memory.

Vertices for a polygon are loaded into Vertex Buffer Memory until the fc_vb_ebxi signal is asserted from the Format Converter. When this signal is received the data is unloaded from the Vertex Buffer Memory into the CF bus fifos before a new primitive can be loaded.

Figure 15:
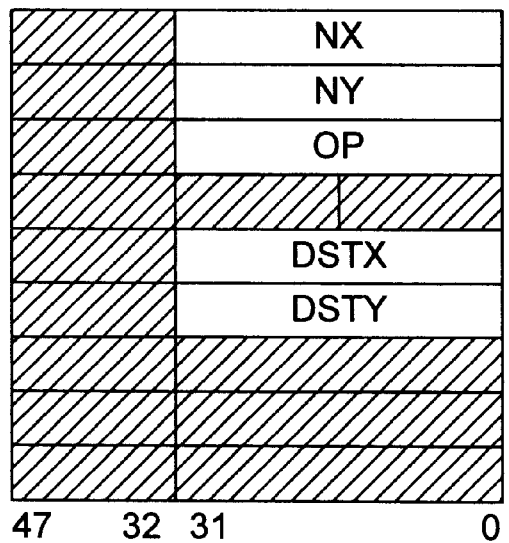
FIG. 15 illustrates vertex buffer storage of FFB fast fill primitives.
Figure 16:
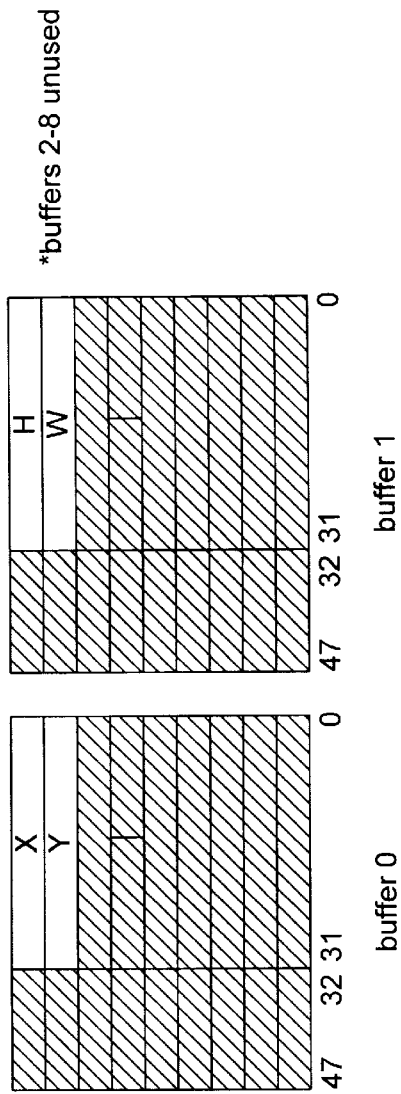
FIG. 16 illustrates vertex buffer storage of FFB rectangles.

FFB fast fill primitives vary in size from 2–5 "vertices." The information stored for a fast fill primitive is shown in FIG. 15. Vertices for a fast fill primitive are loaded into Vertex Buffer Memory until the fc_vb_nxgo signal is received from the Format Converter. When this signal is received the data is unloaded from the Vertex buffer Memory into the CF bus fifos before a new primitive can be loaded.

FFB rectangles are of a fixed number of vertices. The first vertex contains an X,Y location and the second a width and height. This information is always stored in vertex buffer 0 and vertex buffer 1. When two "vertices" have been received the rectangle is sent out over the CF bus before a new primitive can be loaded into the Vertex Buffer Memory.

Figure 17:
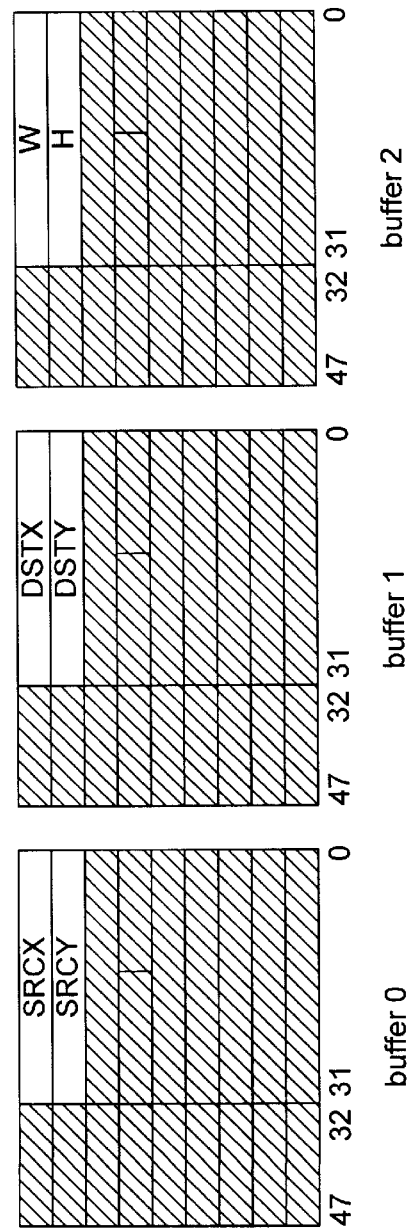
FIG. 17 illustrates vertex buffer organization for vertical scroll.

FFB vertical scroll primitives also contain a fixed number of "vertices." Verticals cross primitives consist of a source and destination w,y location and a width and height. This information is stored as shown in FIG. 17. Once three "vertices" have been loaded into the Vertex buffer Memory the vertical scroll primitive is loaded into the CF bus fifos before a new vertical scroll primitive can be loaded.

2. Loading the Vertex Buffer Memory

Figure 18:
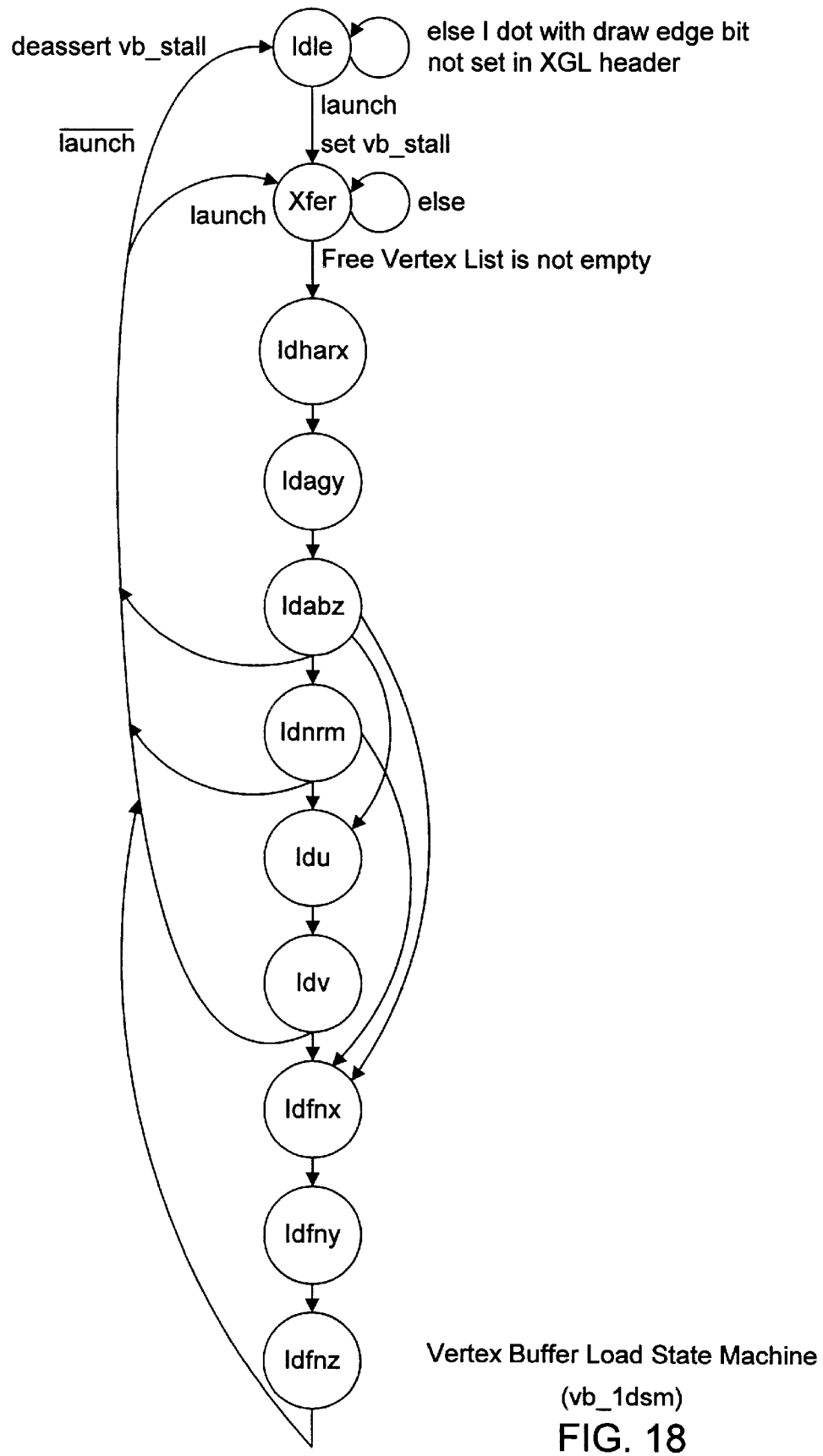
FIG. 18 illustrates the vertex buffer load state machine.
Figure 19:
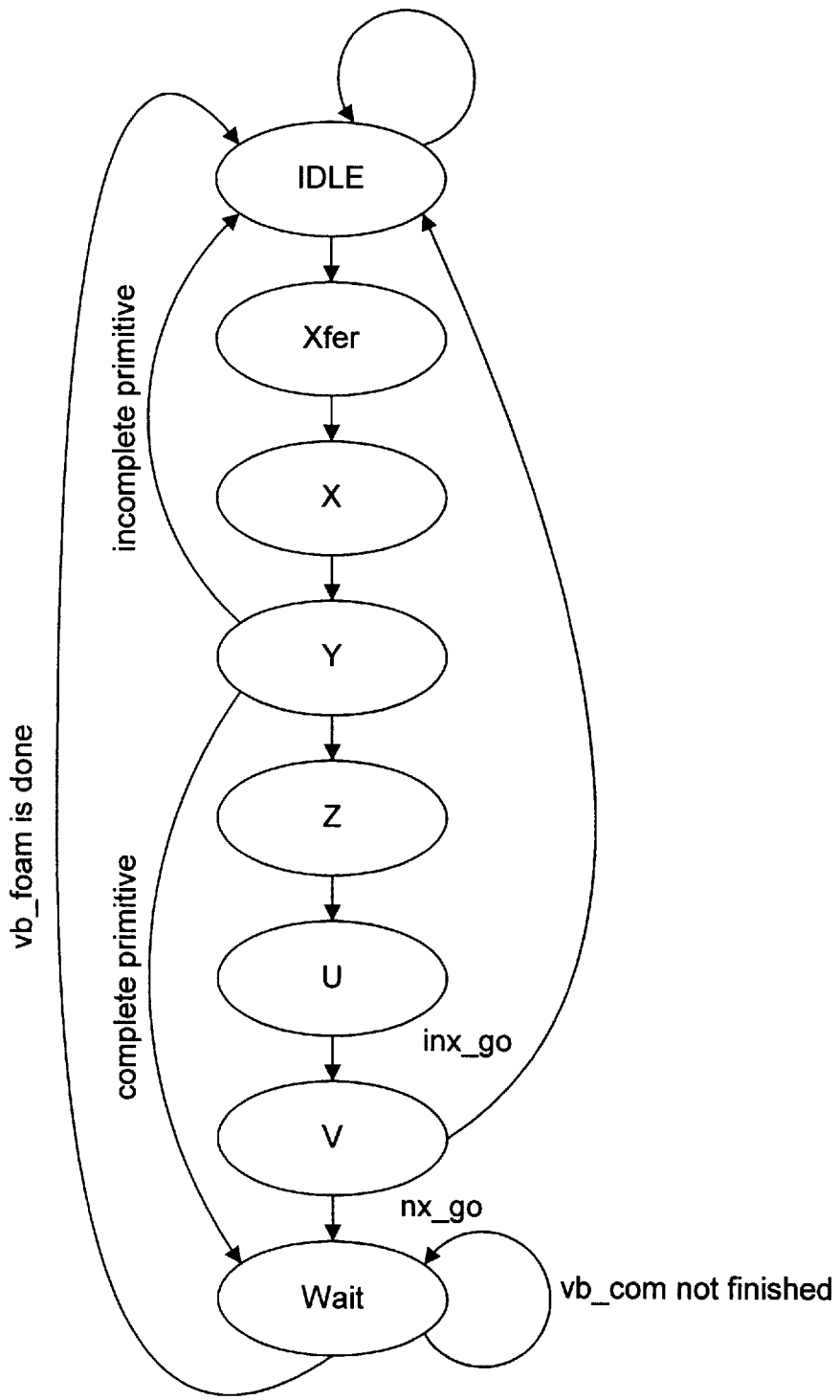
FIG. 19 illustrates the vertex buffer FFB load state machine.

As stated before data is transferred from the VAB when a launch condition is detected. Once a launch (fc_vb_launch) is detected by the vb_ldsm or vb_fldsm the vbi_vab-xfer signal is asserted to the VAB causing it to copy its A buffer to the B buffer. This signal is asserted as the vb_ldsm or vb_fldsm transitions from the idle to the xfer state. FIG. 18 illustrates the state diagram for the vb_ldsm and FIG. 19 for the vb_fldsm. Note that if the Primitive Control Register indicates that the primitive type is a dot and the "draw edge bit" of the XGL header is not set then the vertex is not loaded into the Vertex Buffer Memory (i.e., although allowed by software there is no sense in sending a dot that will never be drawn). The vb_stall signal is asserted as the vb_ldsm or vb_fldsm transitions out of the idle state and is not deasserted until it returns to the idle state. This assures that the Format Converter can not launch another primitive until the B buffer of the VAB has been completely unloaded. Also note that only those components of a vertex that are specified by the Primitive Control Register (the PCR is ignored for the special case FFB primitives) arc actually loaded into the Vertex Buffer Memory (i.e., if the PCR is set such that normals are not in use then they will not be loaded into the VBM from the VAB).

The following paragraphs summarize each state of the vb_ldsm.

Idle—The vb_ldsm stays in the Idle state when no launch condition is present from the Format Converter. When a launch condition is detected it transitions into the Xfer state. Upon entering the Idle state vb_stall is set to false so that the FC may continue to load the VAB but may not launch until all data is unloaded from buffer B of the VAB into the Vertex buffer Memory. Another condition to note here is that if the Primitive Control Register is set to dot mode and a dot with the Draw Edge bit set to zero is launched it is ignored (i.e., no data is transferred to the Vertex Buffer).

Xfer—The Xfer state is entered 1) from the Idle state when a launch is detected and 2) from the last load state (Idabz, ldv, ldfnz) when a launch already exists. Upon entering this state the vb_stall signal is asserted to inform the FC that is can not launch and the data in buffer A of the BAV is loaded into buffer B. the FC must wait until vb_stall is false before it can launch again. Note however that it may load new values into the A buffer until it has a launch.

Idharx—The ldharx state is entered from the Xfer state when there is a pointer available from the Free Vertex List. This pointer is used as an index into the Vertex buffers for writing the data from the VAB. If the Free Vertex List is empty then the transition is not made and the machine sits in the Xfer state until such time as a pointer is available. Entering this state the data from the X, Red, and msb of the alpha registers is loaded into the Vertex Buffer Memory. The Header is also loaded into the New Vertex List along with the pointer provided by the Free Vertex List.

Idagy—The Idagy state is entered from the ldharx state. Entering this state the data in the Green register, Y regiser, and mid four bits of the alpha register of the VAB are loaded into the Vertex Buffer.

Idabz—The Idabz state is entered from the Idagy state. Entering this state the lsb of the Alpha register, Blue register, and Z register of the VAB are loaded into the Vertex Buffer.

Ldnorm—If normals are in use (as determined by the Primitive Control Register) then the data in the Nx, Ny and Nz registers of the VAB are loaded into the Vertex Buffer.

Ldu—If texture data is to be used (as determined by the Primitive Control Register_) then the data in the U register of the VAB is loaded.

Idv—Same as for U except for V.

ldfnx—If facet normals are to be used 9 as determined by the PCR) then the data in the finx register of the VAB is loaded.

ldfny—Same as idfnx but for Y.

ldfnz—Same as ldfnx but for Y.

When the vb_ldsm is finished loading the vertex into the Vertex buffer it also loads the pointer to that buffer into the NVL of the Vertex Pointer Logic. This will be discussed more in the section on the Vertex Pointer logic.

For the vb_fldsm each functions as follows:

Idle—The vb_fldsm transitions from the Idle to the Xfer state when the Collection buffer indicates that an FFB state machine should be used and any of the launch signals (fc_vb_launch, fc_vb_nxgo or fc_vb_ebxi) are present. If the primitive is not complete it returns to the Idle state ot await a new launch. Once the primitive is complete (determined by receiving fc_vb_ebxi, fc_vb_nxgo or the proper number of vertices for the primitive type_the machine transitions to the Wait state and returns to Idle only when the vb_fosm has finished outputting the packet to the CF bus fifos.

Xfer—During the Xfer state the A buffer of the VAB is transferred to the B buffer.

X—During the X state the contents of the X register in the VAB B buffer is loaded into the X location in the current Vertex Buffer.

Y, Z, U, V—These states all cause their associated registers in the B buffer of the VAB to be loaded into the corresponding Vertex Buffer location. For each primitive type the contents of these registers is defined by FIGS. 7-6 thru 7-9.

3. Vertex Pointer Logic

As stated before when the vb_ldsm is finished loading a vertex into the Vertex Buffer the pointer to that buffer is loaded into the New Vertex List of the Vertex Pointer Logic. The vb_vplsm monitors the NVL and when a pointer is available it is unloaded and used to update the registers for building primitives.

Figure 20:
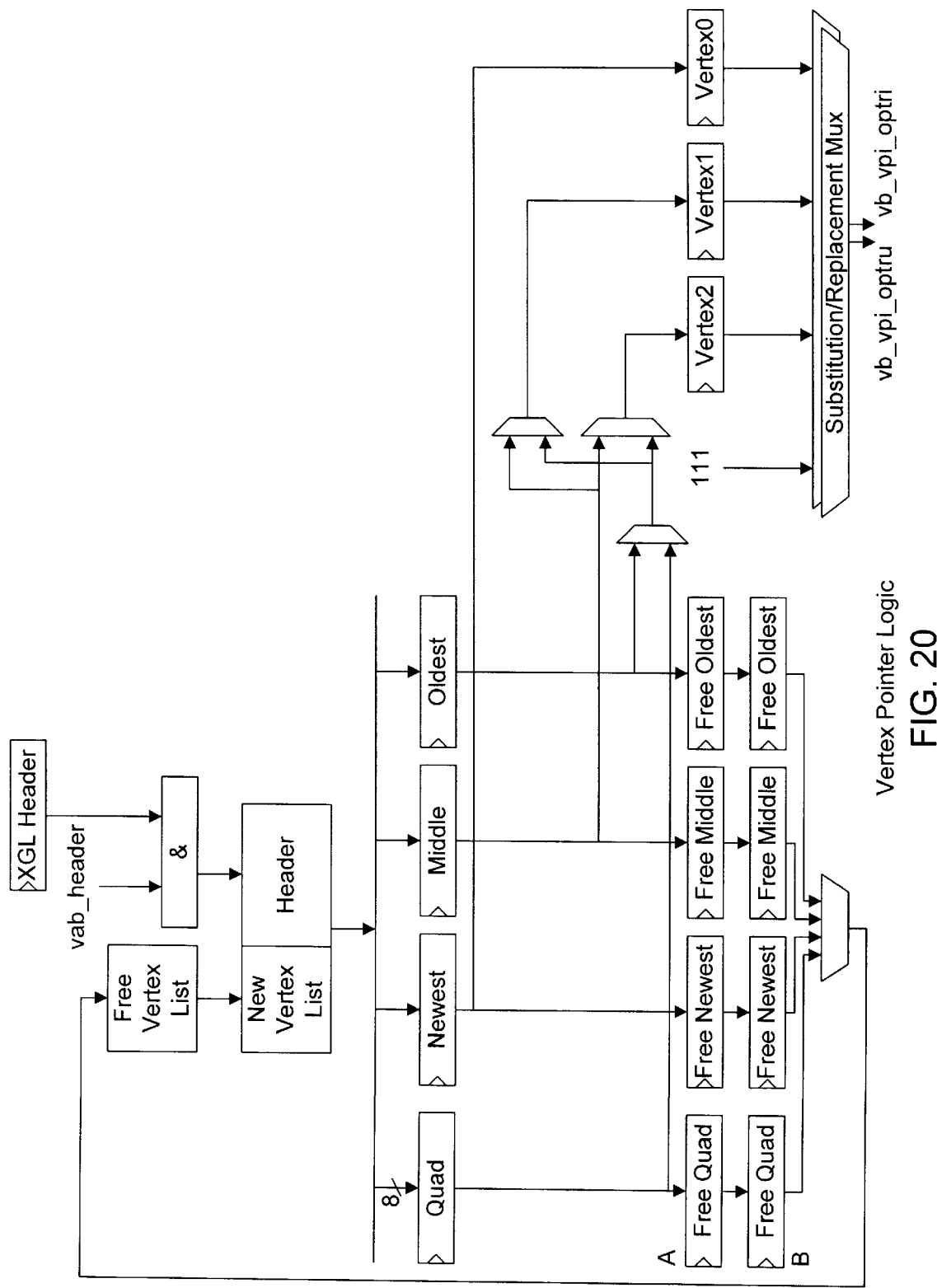
FIG. 20 illustrates the vertex pointer logic.

FIG. 20 shows the Vertex Pointer Logic of the Vertex buffer. This logic manages a set of pointers to be used when reading and writing the Vertex Buffer Memory. The Free Vertex List is a 4x5 fifo used to hold pointers for use by the vb_ldsm. Upon reset or a write to either the Primitive Control Register or the FFB Opcode Register the first four entries in the fifo are set to 3, 4, 5 and 6. Referring to the state diagram of the vb_ldsm in FIG. 18 notice that below the Xfer state is a condition requiring that the Free Vertex List not be empty prior to transitioning to the ldharx state. This simply says that there must be a buffer available before one can be loaded. When the vb_ldsm transitions back to the idle state (i.e., the buffer has been loaded) the pointer acquired from the Free Vertex List is loaded into the New Vertex List. The New Vertex List maintains a set of pointers and headers for each vertex loaded into the Vertex Buffer Memory.

The vb_vplsm monitors the New Vertex List for available data. When a pointer/header is available it is decoded by the vb_vplsm and used to build a primitive based upon the contents of the Primitive Control Register and FFB Opcode Register. A signal from the Collection Buffer indicates to the Vertex Buffer whether it should use the PCR or the FFBOP at any given time. FIG. 8–14 shows the state diagram of the vb_vplsm and all its valid transitions in context of their primitives. The Quad, Newest, Middle and Oldest pointers of the Vertex Pointer Logic are shuffled in a very specific manner according to the table shown in FIG. 8–14. The Vertex Pointer Logic is only used for quads, triangles, lines and dots. Fast fill, vertical scroll, rectangles and polygons do not use the Vertex Pointer Logic.

Each entry in the New Vertex List contains a pointer to a Vertex Buffer as well as the associated header for the vertex. The header information contains four edge bits that must be manipulated and placed into the AFB Header which goes out over the CF bus. FIG. 21 shows how these edge bits relate to triangles. At this time the scheme for manipulating the edge bits is still being worked out and will be updated in a future release of this spec.

The header from the VAB is loaded directly into the New Vertex List along with the vertex buffer pointer. Each header contains a replace code, face orientation bit, and four edge bits.

For an XGL style header the following header format applies. Note that bit 7 may be set to anything by the user but hardware forces it to zero and does not use bit 7 from the user.

| Bit | Meaning |
| --- | --- |
| 0 | Draw edge |
| 1 | Draw previous edge |
| 2–3 | Triangle replace code |
| 4 | Face Orientation |
| 5 | Edge is internal |
| 6 | Previous edge is internal |
| 7 | 0 |

For context restores and substitution buffer loading the following header format applies:

| Bit | Meaning |
| --- | --- |
| 3-0 | vertex buffer index (0–8) |
| 6-4 | not used |
| 7 | 1 |

As each header is loaded into the New Vertex List it is altered according to the mask in the XGL Header Register. If the corresponding mask bits are set then the header bit is loaded from the XGL Header register otherwise it is loaded from the VAB.

The Primitive Control Register determines the current mode of the Vertex Logic. The valid modes for this register include Quads, Triangles, Lines, and Dots. In addition to these modes the PCR defines whether vertices are output with U, V co-ordinates, Normals and Facet Normals as well as whether they are to be ordered or unordered.

4. Unloading the Vertex Buffer

Figure 23:
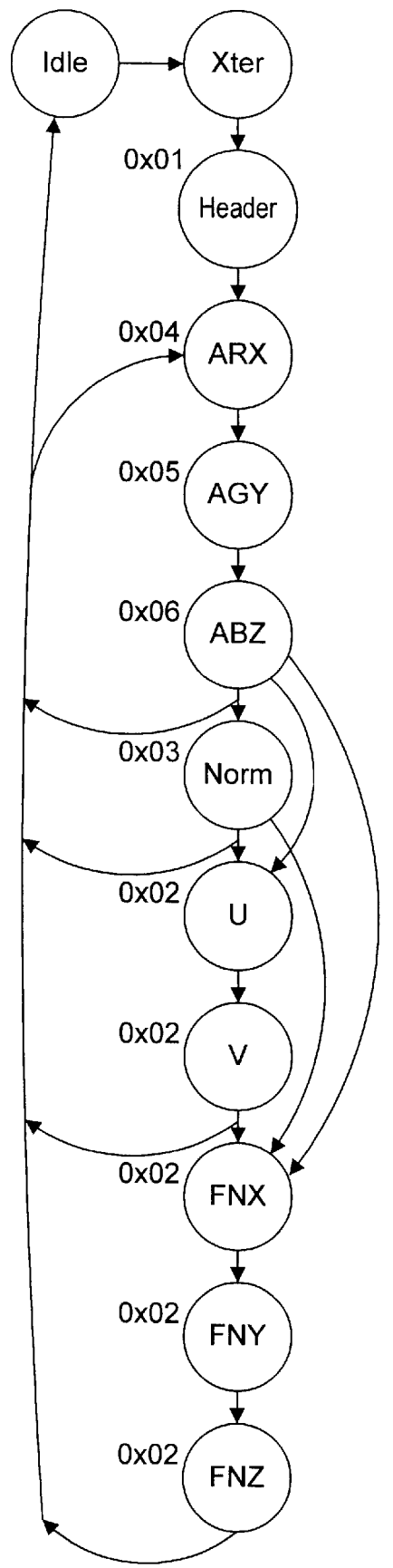
FIG. 23 illustrates the state diagram for the vertex buffer output state machine.
Figure 24:
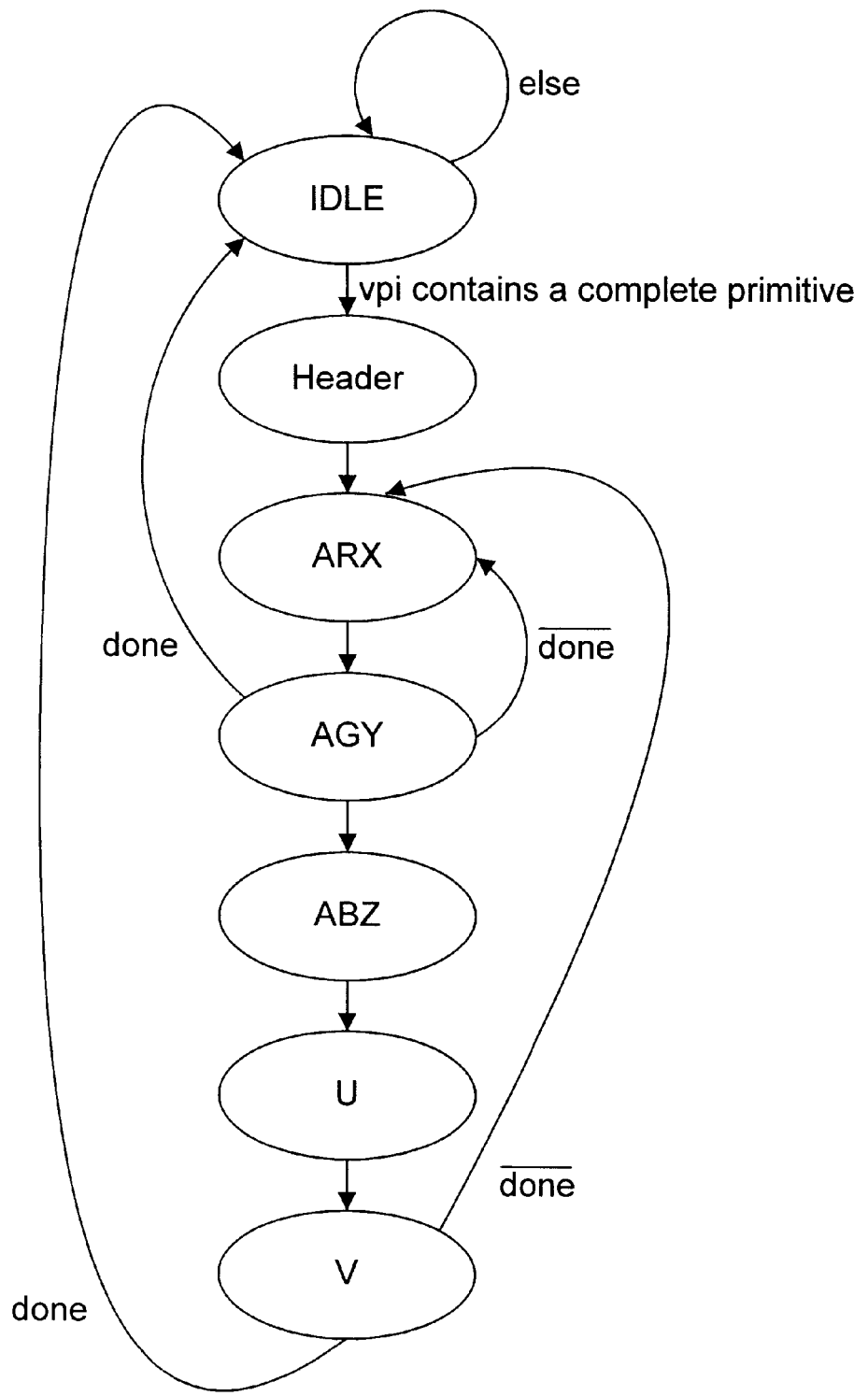
FIG. 24 illustrates the vertex buffer FFB output state machine.

FIG. 23 shows the state diagram for the Vertex Buffer Output State Machine (vb_osm). The hex number beside each state representing a component of a vertex represents the CF bus transfer code which is loaded into the CF bus fifos along with the data. Note that as each state is entered the Substitution/Replication Control Register determines whether the actual data for that vertex is used or whether the data from the substitution buffer (substitution) or another vertex (replication) is used.

Any component (X, Y, Z etc.) may be substituted (have its value replaced by the value of the same component in buffer 8 of the Vertex Buffer) or replicated (have its value replaced by the value of the same component in either the newest or oldest pointer). The Substitution Replication Control Register determines which components are to be replaced. If data is to be substituted the muxes shown in the lower right of FIG. 20 are selected such that buffer 8 is indexed. If data is to be replicated it is copied from the newest or oldest vertex as determined by the control bit in the SRCR. For data that is to be replicated the same muxes select either the newest or oldest vertex pointer for that component.

5. Context

Vertex Buffer context reads occur through two address spaces.0x0060_1D60— 0x0060_1D7C for state registers and 0x0060_1D80—0x0060_1FFC for Vertex Buffer Memory and VAB registers. Context is read over the GDI bus. Writes to Vertex Buffer state register are handled via the same address thru the Collection Buffer via a special tag. See the chapter on the PIF for a description of the tag. The Collection Buffer will assert the proper load enable signal shown in the table of FIG. 26 below along with a 2 bit write address (cb_vb_ctxwadr) to load the Vertex Buffer state registers.

Writes to the VAB and Vertex Buffer Memory are handled via the normal AP addresses thru the Format Converter. When context is read from the VB Memory a special header is read that is used by the vb_ldsm when restoring context.

For proper restoration of context registers must be restored in the following order:
Vertex Buffers
VAB
VB registers other than the PCR and FFBOP
VB state registers
PCR and FFBOP This list will be refined at a later date. User defined registers are shown in FIGS. 25a–d.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A vertex accumulation buffer for improved three-dimensional graphical processing, comprising:

a first buffer for storing a plurality of vertex values wherein said plurality of vertex values include XYZ position values, red, green, and blue values, and alpha values and $N_x$, $N_y$, and $N_z$ normal values; and a second buffer for storing said plurality of vertex values, wherein said first buffer includes a plurality of outputs corresponding to said plurality of vertex values which are provided to corresponding inputs of said second buffer, wherein said first buffer is adapted to receive values, wherein the values remain unchanged in first buffer until a new value overwrites the stored value;

wherein said first buffer is operable to transfer the entire contents of said first buffer into said second buffer.

2. The accumulation buffer of claim 1, wherein new values are written immediately into said first buffer substantially concurrently with the contents in said second buffer being written to from said first buffer.

3. A vertex processing system for accumulating complete geometric primitives, the vertex processing system a vertex accumulation buffer for storing received geometry data, wherein the received geometry data is comprised in a generalized triangular mesh format, wherein said geometry data in the generalized triangular mesh format includes mesh buffer references;

vertex buffer logic coupled to the vertex accumulation buffer which receives data from the vertex accumulation buffer, wherein the vertex buffer logic includes a mesh buffer for storing geometry data, wherein the vertex buffer logic includes vertex pointer logic that maintains pointers which reference vertex data in the mesh buffer, wherein the vertex buffer logic operates to assemble complete geometric primitives.

4. The vertex processing system as recited in claim 3, wherein said vertex accumulation buffer is configured to store at least seven vertices.

5. The vertex processing system as recited in claim 4, wherein each vertex comprises information selected from the group comprising: x coordinate information, y coordinate information z coordinate information, color information, normal information, texture coordinate information, and facet normal information.

6. The vertex processing system as recited in claim 5, wherein each vertex comprises alpha information.

7. The vertex processing system as recited in claim 5, wherein said vertex pointer logic is configured to maintain a free list comprising pointers to vertex buffers that are available to store vertex information.

8. The vertex processing system as recited in claim 5, wherein said vertex buffer logic comprises a plurality of working registers and a state machine having a plurality of states indicative of the number of vertices stored in the plurality of working registers.

9. The vertex processing system as recited in claim 5, wherein said vertex buffer logic comprises a plurality of temporary registers and a state machine having a plurality of states indicative of the number of temporary registers available.

10. A graphics system comprising:

an input configured to receive graphics data; and a vertex accumulation buffer coupled to said input, wherein the vertex accumulation buffer comprises:

a first buffer comprising a first plurality of storage locations; and a second buffer comprising a second plurality of storage locations, wherein each of said first and second pluralities of storage locations are configured to store a particular vertex component value from said graphics data, wherein each of said first plurality of storage locations has an output coupled to a corresponding storage location in said second plurality of storage locations, wherein said first buffer is adapted to receive and store vertex component values, and write vertex component values to said second buffer, wherein said vertex component values stored in said first buffer remain unchanged until one or more new vertex component values overwrite the stored vertex component values, and wherein said first buffer is operable to transfer the entire contents of said first plurality of storage locations into said second buffer.

11. The system as recited in claim 10, wherein said vertex component values are selected from the group comprising: XYZ position values, color values, alpha values, and $N_x$, $N_y$, and $N_z$ normal values.

12. The system as recited claim 11, wherein new vertex component values may be written into said first buffer substantially concurrently with the old vertex component values stored in said first buffer being written to said second buffer.

13. The system as recited claim 11, wherein said second buffer is configured to double buffer said first buffer.

14. The system as recited claim 11, wherein said graphics data received by said input is compressed, and wherein said system further comprises a decompression unit configured to decompress said compressed geometry data and convey said decompressed geometry data to said vertex accumulation buffer, wherein said decompressed geometry data comprises a plurality of vertex component values.

15. The system as recited in claim 14, wherein said compressed graphics data is compressed using geometry compression.

16. The system as recited in claim 14, wherein said compressed graphics data includes a plurality of mesh buffer references configured to allow the reuse of vertex component values.

17. The system as recited in claim 16, further comprising a mesh buffer coupled to said vertex accumulation buffer.

18. The system as recited in claim 17, wherein said mesh buffer is configured to allow the reuse of vertex component values.

19. The system as recited in claim 17, wherein each storage location in said first buffer is capable of being stored to independently of the other storage locations in said first buffer.

20. The system as recited in claim 17, further comprising an input FIFO memory coupled between said input and said decompression unit.

* * * * *